United States Patent
Kambach et al.

(10) Patent No.: US 10,908,882 B2
(45) Date of Patent: Feb. 2, 2021

(54) OBJECT CONFIGURATION UTILITIES

(71) Applicant: AVEVA SOFTWARE, LLC, Lake Forest, CA (US)

(72) Inventors: Julius Robert Kambach, Foothill Ranch, CA (US); Robert M. Resnick, Fountain Valley, CA (US); Shailesh Kumar Ishvarlal Patel, Irvine, CA (US); Madhav Jagannathan, Irvine, CA (US); Steven Michael Weinrich, York, PA (US); R. Christopher Coble, Ladera Ranch, CA (US); Dave Tran, Rancho Santa Margarita, CA (US); Raju Uthu Kumar, Rancho Santa Margarita, CA (US); Douglas Paul Kane, Vashon, WA (US)

(73) Assignee: AVEVA SOFTWARE, LLC, Lake Forest, CA (US)

(*) Notice: Subject to any disclaimer, the term of this patent is extended or adjusted under 35 U.S.C. 154(b) by 0 days.

(21) Appl. No.: 16/293,108

(22) Filed: Mar. 5, 2019

(65) Prior Publication Data

US 2019/0369967 A1   Dec. 5, 2019

Related U.S. Application Data

(63) Continuation of application No. 15/493,242, filed on Apr. 21, 2017, now Pat. No. 10,228,915.

(60) Provisional application No. 62/325,814, filed on Apr. 21, 2016.

(51) Int. Cl.
    *G06F 9/44* (2018.01)
    *G06F 8/34* (2018.01)
    *G06F 8/36* (2018.01)
    *G06F 9/451* (2018.01)
    *G06F 8/71* (2018.01)

(52) U.S. Cl.
    CPC ............. *G06F 8/34* (2013.01); *G06F 8/36* (2013.01); *G06F 8/71* (2013.01); *G06F 9/453* (2018.02)

(58) Field of Classification Search
    CPC .......... G06F 8/71; G06F 9/44505; G06F 8/20; G06F 8/61; G06F 8/36; G06F 8/34; G06F 9/453
    USPC .................................................. 717/107–121
    See application file for complete search history.

(56) References Cited

U.S. PATENT DOCUMENTS 10,228,915 B2 * 3/2019 Kambach ............... G06F 9/453

\* cited by examiner

*Primary Examiner* — Chuck O Kendall
(74) *Attorney, Agent, or Firm* — Greenberg Traurig, LLP

(57) ABSTRACT

Configuration utilities, such as object wizards, enable automatic configuration of domain-specific assets from object templates based on domain specific options. In an aspect, an application object template library stores a set of previously defined application object templates. The templates each include a superset of options common to a set of related domain objects. A configuration utility is configured for specifying at least one domain-specific option of the superset and creating an application object instance to be included in an application. The application object instance comprising at least one of the application object templates having the specified domain-specific option.

20 Claims, 21 Drawing Sheets

OBJECT CONFIGURATION UTILITIES

CROSS-REFERENCE TO RELATED APPLICATION

This application is a continuation of U.S. patent application Ser. No. 15/493,242 filed Apr. 21, 2017, which claims priority from U.S. Provisional Patent Application No. 62/325,814, filed Apr. 21, 2016. The entire contents of the above-identified applications are expressly incorporated herein by reference, including the contents and teachings of any references contained therein and appendices thereto.

TECHNICAL FIELD

Aspects of the present disclosure generally relate to development and configuration of processor-executable applications that monitor and/or control components in industrial processes. More particularly, aspects relate to systems and methods for automatically configuring domain specific objects for use in industrial software design and management.

BACKGROUND

Typical industrial processes are extremely complex and receive substantially greater volumes of information than any human could possibly digest in its raw form. By way of example, it is not unheard of to have thousands of sensors and control elements (e.g., valve actuators) monitoring/controlling aspects of a multi-stage process within an industrial plant. These sensors are of varied type and report on varied characteristics of the process. Their outputs are similarly varied in the meaning of their measurements, in the amount of data sent for each measurement, and in the frequency of their measurements. As regards the latter, for accuracy and to enable quick response, some of these sensors/control elements take one or more measurements every second. Multiplying a single sensor/control element by thousands of sensors/control elements (a typical industrial control environment) results in an overwhelming volume of data flowing into the manufacturing information and process control system. Sophisticated data management and process visualization techniques have been developed to handle the large volumes of data generated by such system.

Highly advanced human-machine interface/process visualization systems exist today that are linked to data sources such as the above-described sensors and controllers. Such systems acquire and digest (e.g., filter) the process data described above. The digested process data in-turn drives a graphical display rendered by a human machine interface (HMI). Examples of such systems are the well-known Wonderware INTOUCH™ HMI software system for visualizing and controlling a wide variety of industrial processes and the ArchestrA™ (e.g., the application server or AppServer for INTOUCH™) comprehensive automation and information software open architecture designed to integrate and extend the life of legacy systems by leveraging the latest, open industry standards and software technologies.

Control system development environments allow for the configuration, development, and deployment of applications to runtime environments on control components in industrial processes. For example, Wonderware System Platform, available from Schneider Electric, provides industrial software design and management services. It acts as a company's "industrial operating system" by providing various services including visualization, configuration, deployment, communication, security, data connectivity, data storage and management, people collaboration, and so forth.

Known object-based development environments can model an industrial plant by logically representing processes, physical equipment, and industrial systems with re-usable application objects. Standardized, pre-tested objects are available for building equipment or process templates. Unfortunately, configuring and using assets (i.e., application objects templates) can be very complex and difficult. It requires significant understanding of both the domain being modeled and an understanding of the object oriented principles of industrial software design and management services platform.

For example, consider object templates that model pumps. The goal is to enable users (e.g., electrician, maintenance engineer, etc.) to select an object template that exactly matches a pump being added during upgrades and/or plant modifications. Because the plant has been in operation for many years, the pumps already installed are quite diverse. Some pumps are powered by electric motors while others are pneumatic; some have speed sensors, some have temperature sensors, some have both, some have neither; and some of the pumps are in explosive environments such that they must meet a higher level of safety, putting them in either explosion-proof Division 1 or Division 2.

A conventional template derivation, such as shown in FIG. 1, for modeling pumps must account for all variations in each branch at each level of the hierarchy because each level inherits the attributes and properties of its parent level. In the example of FIG. 1, the different levels are referred to as Level 0 to Level 4. For three variables (e.g., power, sensors, division), there must be at least nine final templates (e.g., leaves) in the hierarchy. FIG. 1 illustrates a type of power variable at Level 2, a type of sensor variable at Level 3, and a division variable at Level 4. From these three variables, the hierarchy of FIG. 1 has three leaves at Level 3 under Pneumatic Pump and six leaves at Level 4 under Electric Pump, requiring at least nine final templates. Thus, using a hierarchy to derive object attributes and properties can become quite unmanageable and difficult to understand, especially in complex industrial plant environments.

SUMMARY

Aspects of the disclosure provide object configuration utilities (e.g., wizards, etc.) that allow users to configure and utilize object templates by selecting a number of options and making choices based on the domain equipment being modeled. In turn, the object templates automatically configure the assets. This greatly simplifies the usage of object templates and speeds the development of process control system applications such as supervisory control and data acquisition (SCADA) applications.

In an aspect, a template-based supervisory process control and manufacturing information application development platform includes an application object template library and a configuration utility. The application object template library stores a set of previously defined application object templates. Each of the application object templates includes a superset of options common to a set of related domain objects. The configuration utility is configured to specify at least one domain-specific option of the superset and create an application object instance to be included in an application. The application object instance comprises the configuration settings of at least one of the application object templates and the specified domain-specific options and configuration settings.

In another aspect, a computer-implemented method of deriving application object instances includes an application object template library storing a set of previously defined application object templates. The templates each include elements representing a superset of domain-specific options common to a set of related assets of an industrial process. An object wizard specifies at least one of the domain-specific options for at least one element within a template. The object wizard creates instances of the application object templates to be included in a supervisory process control and manufacturing information application for the industrial process. The instances comprise application objects instantiated from selected application object templates including the domain-specific options. The object wizard automatically configures the instances with the selected domain-specific options.

In yet another aspect, a computer readable storage device stores processor readable instructions that, when executed by a processor, provide a template-based supervisory process control and manufacturing application development platform. The platform includes an application object template library and an object wizard capability. The library stores a set of previously defined application object templates that each include elements representing a superset of domain-specific options common to a set of related assets of an industrial process. The templates also include domain-specific options. The object wizard is configured for specifying at least one of the plurality of domain-specific options for each element and creating instances of the application object templates to be included in an application. The instances comprise application objects instantiated from selected application object templates including selected domain-specific options. The instances are automatically configured with the selected domain-specific options.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 2:
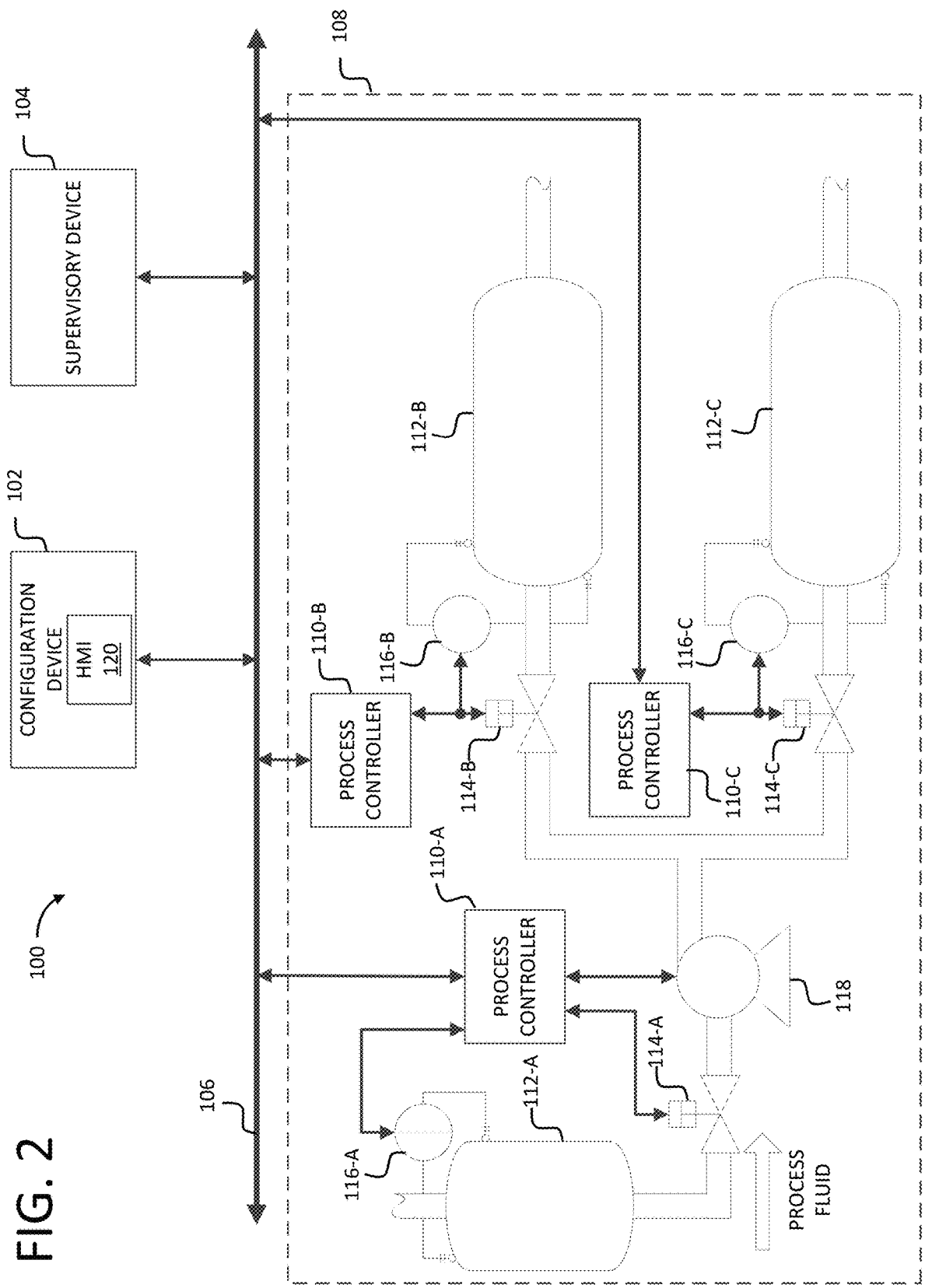
FIG. 2 illustrates an exemplary industrial process system within which aspects of the disclosure may be incorporated.

FIG. 2 illustrates an exemplary system 100 within which an embodiment may be incorporated. In this instance, the system 100 includes a configuration device 102, a supervisory device 104, a communications infrastructure 106, and an exemplary plant, such as a fluid processing system 108. As illustrated, the fluid processing system 108 includes process controllers 110, tanks 112, valves 114, sensors 116, and a pump 118. In system 100, the configuration device 102, the supervisory device 104, the process controllers 110, the tanks 112, the valves 114, the sensors 116, and the pump 118 are communicatively coupled via the communications infrastructure 106. Wonderware System Platform, for instance, is capable of interfacing to hundreds of field devices and plant systems, allowing extensive re-use of engineering, easing maintenance burdens, and providing broad scalability and extensibility while accommodating new computing technologies such as virtualization.

The Wonderware System Platform services allow an organization to build a single, unified "plant model" that logically represents processes, physical equipment and industrial systems and even legacy systems, making the design and maintenance of these systems more efficient and flexible with less risk. The plant model also gives context to data, greatly assisting with diagnostics and troubleshooting while providing valuable system documentation throughout the system lifecycle. The plant model is unique to the Wonderware System Platform.

The object-based application development environment provided by Wonderware System Platform enables building, testing, deploying, and maintaining a wide range of industrial applications using re-usable application objects.

As described above, configuring and using assets (i.e., application objects templates) can be very complex and difficult. It requires significant understanding of both the domain being modeled and an understanding of the object oriented principles of industrial software design and management services platform.

Object configuration utilities (e.g., wizards, etc.) embodying aspects of the disclosure allow users to configure and utilize object templates by selecting (e.g., specifying) a number of options and making choices based on the domain equipment being modeled which then automatically configures the assets. This greatly simplifies the usage of object templates and speeds the development of process control system applications such as supervisory control and data acquisition (SCADA) applications. In an embodiment, object templates are stored in an application object template library.

As used herein, the term "configuration utility" includes a graphical user interface (GUI) presentation of options, choices, and/or settings and the behaviors associated therewith. In an embodiment, a configuration utility is an object wizard, but one of ordinary skill in the art will understand that other types of configuration utilities are within the scope of the present disclosure. In addition, the term "wizard consumer" includes a user configuring an object wizard instance and/or the GUI that presents the user with the wizard options, choices, and/or settings. As used herein, the term "choice" includes a named selectable alternative within a choice group. Moreover, the term "choice group" includes a customized group of related choices and name and/or prompt to describe them. Furthermore, the term "option"

includes a named True/False value. As used herein, the term "associated attribute" includes a link between an attribute of a simplified attribute editor (e.g., the object itself) and a single choice or option. The term "setting" includes a configurable value associated with an associated attribute. As used herein, the term "simplified attribute editor" or "SAE" includes a host of the wizard definition GUI. SAE is used to characterize the attributes and settings of the template or instance itself as opposed to the wizard's associated attributes and settings in accordance with one or more embodiments. An "associated symbol" includes a symbol that is linked with the object. The term "associated symbol wizard" includes a link between an associated symbol of the object and a single choice or option. A "symbol wizard" or "SW" includes properties of the associated symbol. And as used herein the terms "overview symbol" and "container symbol" include the symbol containing an embedded symbol from the instance.

Referring further to FIG. 2, the configuration device 102 is adapted to provide a development environment that enables the design, development, and deployment of applications that are executed by process controllers 110 to control aspects of fluid processing system 108. In the exemplary embodiment of FIG. 2, configuration device 102 executes processor-executable instructions embodied on a storage memory device to provide the development environment and other capabilities via a software environment, as further described herein. In an embodiment, configuration device 102 is any computing device capable of executing processor-executable instructions including, but not limited to, one or more servers.

The supervisory device 104 is adapted to enable management of applications. In an embodiment, supervisory device 104 executes processor-executable instructions embodied on a storage memory device to provide a human-machine interface (HMI) application manager 120. For example, aspects of supervisory device 104 may provide a graphical representation of components of fluid processing system 108 that facilitates monitoring and administration of a manufacturing process. In an embodiment, HMI 120 is configured to interact with update logic in a process controller 110 to alarm or prompt a user of an update and to provide operator feedback where required. An exemplary HMI application manager is the Wonderware System Platform available from Schneider Electric. In another embodiment, aspects of application management are provided by configuration device 102.

The communications infrastructure 106 is capable of facilitating the exchange of data among various components of system 100, including configuration device 102, supervisory device 104, and components of fluid processing system 108 (e.g., process controllers 110, valves 114, sensors 116, etc.). The communications infrastructure 106 in the embodiment of FIG. 2 includes a local area network (LAN) that is connectable to other telecommunications networks, including other LANs or portions of the Internet or an intranet. The communications infrastructure 106 may be any telecommunications network that facilitates the exchange of data, such as those that operate according to the IEEE 802.3 (e.g., Ethernet) and/or the IEEE 802.11 (e.g., Wi-Fi) protocols, for example. In another embodiment, communications infrastructure 106 is any medium that allows data to be physically transferred through serial and/or parallel communication channels (e.g., copper, wire, optical fiber, computer bus, wireless communication channel, etc.). In an embodiment, communications infrastructure 106 comprises at least in part a process control network.

Still referring to FIG. 2, the fluid processing system 108 is adapted for changing or refining raw materials to create end products. It will be apparent to one skilled in the art that aspects of the present disclosure are capable of optimizing processes and processing systems other than fluid processing system 108 and that system 108 is presented for illustration purposes only. Additional exemplary processes include, but are not limited to, those in the chemical, oil and gas, food and beverage, pharmaceutical, water treatment, and power industries. For example, processes may include conveyers, power distribution systems, and/or processes or operations that cannot be interrupted. In an embodiment, process controllers 110 provide an interface or gateway between components of fluid processing system 108 (e.g., valves 114, sensors 116, pump 118) and other components of system 100 (e.g., configuration device 102, supervisory device 104). In another embodiment, components of fluid processing system 108 communicate directly with configuration device 102 and supervisory device 104 via communications infrastructure 106. In yet another embodiment, process controllers 110 transmit data to and receive data from configuration device 102, supervisory device 104, valves 114, sensors 116, and/or pump 118 for controlling and/or monitoring various aspects of fluid processing system 108.

The process controllers 110 of FIG. 2 are adapted to control and/or monitor aspects of fluid processing system 108. In an embodiment, processor controllers 110 are physical or virtual programmable logic controllers (PLC) that control and collect data from aspects of fluid processing system 108. Virtual PLCs may run on a distributed computing environment that is local to the plant in some embodiments.

In an embodiment, asset standards (e.g., application object templates in Wonderware System Platform) are templates used for creating domain specific objects (i.e., assets) representing equipment, processes, products, or other real world entities within a supervisory control application. System engineers create and configure elements within the standard (attributes, symbols, and scripts). More specific asset standards can be derived from generic ones when the need to specialize them arises. Within a derived standard, a system engineer configures elements inherited from the more generic standard (attributes, symbols, and scripts) and can additionally create new elements if required.

For example, a generic asset standard (e.g., template) representing a valve can be created that contains elements common to all valves. More specific valve standards (e.g., 2-way, 3-way, analog, discrete, etc.) can be derived that configure the common elements of the generic valve standard appropriately as well as add additional capabilities unique to the specific type of valve represented by the particular standard. In this manner, aspects of the present disclosure provide benefits over conventional approaches by including common capabilities in a single template while still supporting final configured instances that include only relevant elements. In an embodiment, derived standards modify elements of a template and/or change the default selection and/or values for its options, choices, and/or settings. In another embodiment, wizard options and choices within derived standards that are preconfigured (e.g., defaulted to a different value) are optionally hidden from a user (e.g., engineer, etc.) that leverages the new derived standard, thereby simplifying the complexity of the wizard user interface presented within the configuration utility to configure an instance.

According to aspects of the disclosure, the configuration utilities described herein extend the existing application object template model. In an embodiment, object wizards are asset standards that extend the above-described model by allowing domain-oriented engineers to define (e.g., specify) a set of domain-specific options and choices. An asset builder uses the defined options and choices to select when configuring a specific asset based on the standard. Elements of that asset are automatically configured or excluded from configuration based on choices made. In an embodiment, the system engineer provides these values within the asset standard. Asset builders no longer need to understand the complexity of the object's elements in order to configure them since the details of the domain specific object's elements are encapsulated within this additional, simple, domain-specific layer.

Figure 1:
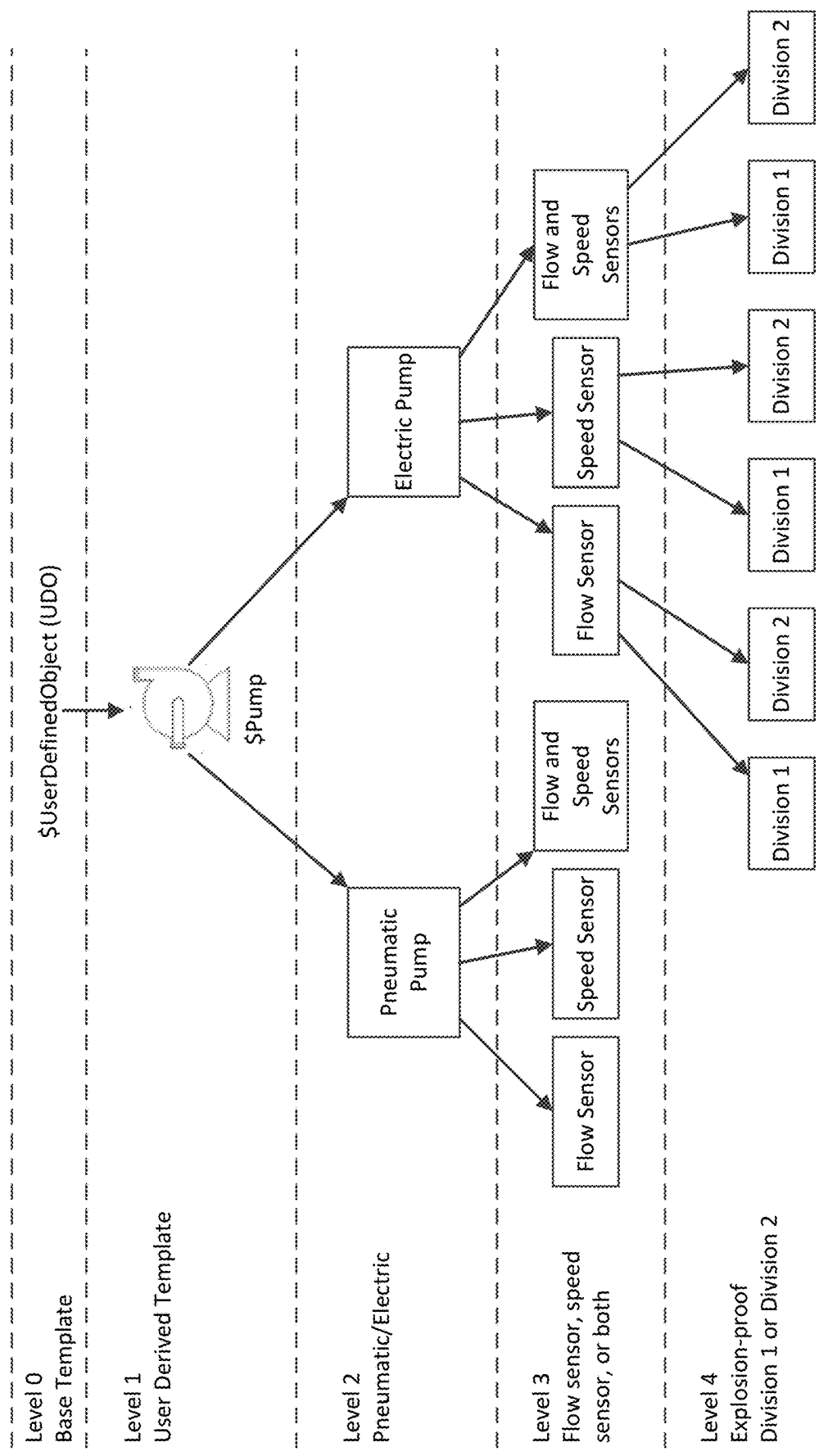
FIG. 1 illustrates an exemplary template hierarchy utilized by conventional systems and methods.

As described above, a template derivation would have to account for all variations in each branch at each level of the hierarchy because each level inherits the attributes and properties of its parent level. For the three variables (power, sensors, division) shown in FIG. 1, for example, a template derivation would require at least nine final templates (e.g., leaves) in the hierarchy. Thus, in contrast to the present disclosure, using a hierarchy to derive object attributes and properties can become quite unmanageable and difficult to understand. The fact that object wizard assets can be simpler than the standard on which they are based minimizes the need for leveraging derivation to add elements to asset standards throughout the derivation hierarchy (which can create maintenance issues). It also enables configuring all elements in a single space, which avoids one of the common pitfalls of derivation.

The choice groups and options (questions) and choices (possible answers) presented to the asset builder include visibility rules that can hide questions (or potential answers) based on the set of earlier answers given. This facilitates the creation of object wizards that present their questions in the form of a decision tree. Moreover, object wizards can be derived from more generic object wizards to further simplify the experience for the asset builder.

In an embodiment, object wizards build on Wonderware System Platform to provide a solution based on templates and inheritance.

Templates with configuration utility (e.g., object wizard and symbol wizard) integration capabilities provide an alternative mechanism for creating the same instances without the maintainability issues associated with deep template hierarchies. A key driver for customers to create deep and wide hierarchies of derived templates is the need to cover all possible combinations of the variations of the equipment type being modeled. Because the goal of a template is to enable multiple instances to be created while minimizing the need to add similar attributes or functionality into each instance, all common functionality should be placed inside the template. For equipment that can take on many different forms and/or has several significant options, this process requires multiple levels of derivation.

The following describes an exemplary process embodying aspects of the present disclosure:

Creating an object wizard: A new object wizard is created by defining/specifying wizard choice groups or options within an application server template. By design, any template can potentially be an object wizard. A template becomes an object wizard whenever it contains wizard choices/options, and ceases to be an object wizard when the last choice/option is removed.

Where and how—wizard configuration user interface: The user interface for defining an object wizard is integrated into the SAE according to an embodiment. For example, a button (with two-state indicator highlighted when the template is an object wizard) is used to show the wizard user interface. The wizard user interface displays all configured choice groups, choices, and options as well as the associated attributes, their settings, and the like.

Defining (add/remove) choice groups: A choice group includes a prompt or question and a set of possible answers. Choice groups each contain two or more choices. One choice is selected within the editor and will be the default when the wizard is used to configure (e.g., create) an instance and/or is tested. When a choice group is first added, it will be given a prompt unique from all other choices within that choice group (e.g., Group #1). Newly created choice groups will have their first choice initially selected as the default.

Changing choice group prompt text: Each choice group has an associated prompt that can be edited at any time by the wizard designer within the template that defines it. Choice groups have prompts unique from other choice groups or options.

Changing the default choice: The default choice can be changed for any choice group whether defined by the template or its parent.

Defining (add/remove) choices within a choice group: When a choice is first added it will be given a prompt unique from all other choices within that choice group (e.g., Choice #1). When the currently selected (e.g., default) choice is removed, the first remaining choice within the choice group will be selected.

Changing choice prompt text: Each choice has an associated prompt that can be edited at any time by the wizard designer within the template that defines it. Choices have prompts unique from other choices within their choice group.

Defining (add/remove) options: When an option is first added it will be given a prompt unique from all other choices within that choice group (e.g., Option #1).

Changing option prompt text: Each option has an associated prompt that can be edited at any time by the wizard designer within the template that defines it. Options have prompts unique from other choice groups or options.

Changing the default state of option: An option's default state can be enabled (e.g., selected) or disabled (e.g., deselected).

Reordering existing choice groups, choices, and options: Existing choices can be moved up or down relative to the other choices defined within the same choice group. Existing choice groups and options can be moved up or down relative to the other choice groups and options. Reordering will change the visibility expression and user will be prompted for confirmation if the user wants to cancel the reordering. The visibility expressions refer the options or choices from top of the selected choice or option.

Hiding choice groups, choices, and options from the wizard consumer: Choice groups, options, and choices can be hidden either permanently or depending on the value of another option or choice group. Permanently hiding a choice group, option, and/or choice is allowed when it is inherited.

Hiding (from wizard consumer) unless a related option or choice is selected: Choice groups, options, and/or choices can be hidden from the wizard consumer unless a single related option or choice is selected. They effectively become "nested" to the related option or choice and presented to the wizard consumer when that option and/or choice is selected.

Hiding from the wizard consumer unless a Boolean expression referencing options or choice is True: Choice groups, options, and/or choices can be hidden from the wizard consumer unless a Boolean expression based on related options and/or choices evaluates to True. Expressions include the following:
1. Case insensitive fully qualified option/choice selections quoted with brackets. For example: [Choice Group #1::Choice #2] or [Option #1::True]
2. "And" and "Or" binary operators
3. "Not" unary operator
4. Parenthesis: "(" and ")"

In an embodiment, whitespace outside of literals and operators is ignored, "And" has higher precedence than "Or", "Not" has higher precedence than "And" or "Or", "&&" or "&" can be used in place of "And", "||" or "|" can be used in place of "Or", and/or "!" can be used in place of "Not". In another embodiment, choice group, option, and choice prompts can contain any text except for square brackets and "::" to support being included in expressions.

Runtime impact of visibility expression on option or choice group: When option or choice group is not visible (e.g., due to expression) then the system will apply the default value of hidden option and choice group, which is defined by the wizard creator. This is different behavior than a symbol wizard rule. The object wizard allows the wizard creator to configure the option or choice group similar to symbol wizard style behavior. The object wizard also gives flexibility. This change in behavior helps the wizard creator to create minimal options and hide many advanced options which are not required to configure for the wizard consumer unless the wizard consumer chooses the advanced options.

Hiding from the wizard consumer (available if inherited): Inherited choice groups, choices, and/or options can be permanently hidden within a derived template. Hiding an inherited option and/or choice group effectively locks the specified default value or choice within the child template. Hiding an inherited choice (not the choice group that contains it) removes that choice from the inherited choice group presented to the wizard consumer. The currently selected default choice cannot be hidden. If less than two choices remain visible within a choice group the choice group itself will be hidden.

Figure 9:
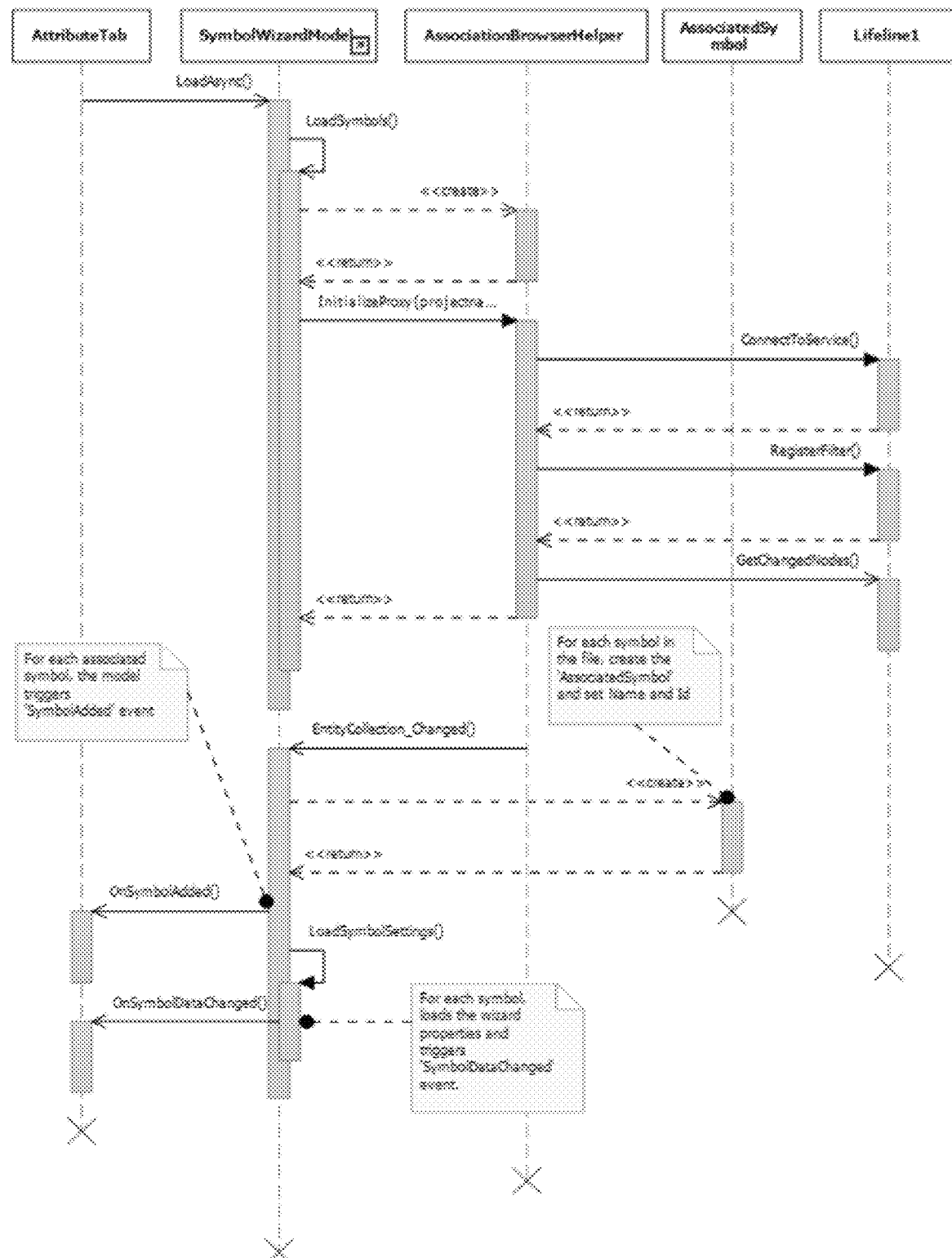

Associating attributes with choices and options: User Defined Attributes (UDA) (e.g., locked or unlocked) within the wizard template can be associated with one or more choices or options. FIG. 9 illustrates an exemplary Sequence—Get associated symbols. This association is used by the wizard to determine whether the attribute will be required within instances derived from the wizard template. If associated with multiple choices, the attribute's configurable settings can be configured with unique values depending on the selected choice. Settings for associated attributes can also be optionally exposed within the wizard consumer's editor to be customized for each instance. In an embodiment, attributes explicitly added to an object maintained in a centralized configuration database (e.g., a galaxy) by a user (e.g., engineer) is a UDA. The user (e.g., engineer) specifies the name, data type, default value, and like aspects of a UDA when it is defined. In a further embodiment, attributes that are not UDAs are defined and added implicitly to the object when it is first created or when additional capabilities (e.g., scripts, attribute features, etc.) are later added. In an aspect, the names and data types of a non-UDA attribute are not configurable.

Impact on associated attributes: Any attribute associated with one or more options or choices will become a candidate for removal from an instance if none of its related choices/options are selected. During an object edit session, attributes that are candidates for removal will not actually be removed until the instance is saved. This ensures that no configured settings within the instance are lost if a choice or option is deselected and then immediately re-enabled within the same edit session. Attributes that are candidates for removal are filtered from the main SAE attribute list. When an option or choice is enabled or selected within an instance any associated attributes that are found to be missing from the object will be immediately added back to the object with their original inherited value. The selected (e.g., default) choices and option values have no impact on templates.

Impact on virtual primitive (e.g., limit alarms Hi, HiHi, Lo, LoLo, etc.): The wizard creator can enable lock the Hi.Priority to enforce the priority any time Hi alarm is enabled by any choice. Conventional systems prevent removing the virtual primitive (e.g., Hi, HiHi, etc.) if any of its attributes (e.g., priority) are locked. This is allowed in object wizard child objects.

Settings (e.g., overriding a different value for different option/choice) include:
Unlocked, Not Hidden, Configurable "Child" Attribute Values
SAE-Specific Attribute Values include:
Whether the attribute is buffered
The attribute's I/O Mode
Whether Scaling is enabled for I/O
Whether or not the I/O source and destination are independent
Attribute Features that are Enabled/Disabled Configuring settings for associated attributes: Each associated attribute has one or more configurable settings. These include the attribute's value as well as the value of any configurable attribute associated with its features. If there is conflict of settings (e.g., two or more settings applicable due to current selection) the user will be warned, for example with a visual indication.

Dynamic nature of settings: The settings that can be configured in a system platform (e.g., ArchestrA) feature depend on how other settings are configured. For example, a Hi alarm needs to be enabled (e.g., enabled flag set to true) before its limit can be specified. Since it is possible in the above example for the alarm to be enabled by one choice's setting and have its limit configured by another, the list of available settings considers whether the alarm flag could be set simultaneously by any choice's setting when considering whether to make the dependent setting (e.g. Limit) configurable.

Providing specific setting values for each associated option/choice: A different value for the same setting can be specified depending on the choice the attribute is associated to. For example, the "small" choice may have "20" specified for the Hi.Limit while the "large" choice has "60".

Ability to hide settings from the wizard consumer: By default, configurable settings for associated attributes are not shown to the wizard consumer unless marked as needing to be shown. Whether shown or not, the configured values for that choice are applied as the choices and/or options are selected. When the settings are shown, the wizard consumer has the ability to further customize the settings for each instance beyond the configurations performed by the wizard based on the selected choice.

Resetting overridden (e.g., changed) settings to default (e.g., original value): The ability to reset the value to the one configured as the main SAE default value may be provided.

Indication of non-default settings: Any setting with a non-default value (e.g., relative to the main SAE attribute value) may be indicated as such within the wizard settings editor.

Impact of settings: Modified settings are applied (e.g., copied to actual attributes, etc.) as choices/options and selected within instances. A checked-in object will reflect the settings. This means, during the creation of an instance, saving of an instance, and/or cascade check-in of the wizard template, all child instances will be updated based on latest object wizard and settings changes in wizard template.

Filtering: If desired, the list of settings can be filtered (e.g., by name) in a manner similar to the main SAE attributes list.

Testing (preview) wizard: The wizard consumer will have an option to test behaviors of the object wizard without checking-in the template and creating an instance from it. In an embodiment, testing behaviors include the impact of wizard option and choice selection on the visibility of other choice groups, choices, and/or options, the impact of the wizard on the overall namespace of the object shown in the main SAE attribute list, wizard setting values for the selected choices and/or options temporarily appearing in the SAE as attribute values, and the like. In an embodiment, the test mode is automatically turned off if the wizard GUI is hidden. When the test mode is turned off, all attributes and hidden wizard prompts are restored to their previous states.

Derive from (e.g. specialize) an existing wizard: In general, the process of defining wizard choices and options in a derived template is identical to the first level editable template. Exemplary additional behaviors within the wizard GUI include inherited choice groups, choices, and/or options are displayed with a unique color or other indicator, the supported actions for an inherited choice group includes changing the default choice or hiding it from the wizard consumer, the supported action for an inherited choice is to hide it from the wizard consumer, and the supported actions for an inherited option is to change the default value or hide it from the wizard consumer.

Wizard utilization by the wizard consumer: Utilization of the wizard is a similar experience to its test mode except that attributes and their features will actually be added or removed and the appropriate settings for the selected choices will be applied. Any attributes found to be missing when choices and/or options requiring them are selected will be immediately added back, while the removal of unneeded attributes based on the wizard configuration is deferred until the instance is saved. Similar to the test mode, choice groups, choices, and/or options are hidden based on the current option and choice configuration, settings that are not hidden can be configured, and all exposed settings will be available.

Configured settings: Configured settings are immediately applied to their corresponding attributes as the choices and/or options requiring them are selected and as they are edited by the wizard consumer.

Indication of non-default settings: Any setting with a non-default value (e.g., relative to configured settings for the selected choice and/or options) will be indicated as such to the wizard consumer. The wizard consumer will have an option to reset the value to the one configured as the default for the current choice and/or option.

Propagation rules for options and choice group changes: Added or deleted options, choice groups, and/or choices will be propagated with value from the template. Exemplary propagation rules include:

1. Renaming of options and/or choice group will retain checked status in child overrides.
2. The instance looks like the template until editing of the instance.
3. When a user has modified in a child object, the checked choice will be retained during propagation.
4. Wizard template will have a remove override command for individual options and/or choice groups.
5. Wizard template will have a remove override command for individual settings.
6. The wizard creator needs to know override settings.
7. The wizard consumer should have a visual indication of what has been overwritten for choices and/or attributes.

Aspects of the present disclosure permit wizard integration (object wizard and symbol wizard integration) as described below.

In some embodiments, the system is modified to provide wizard options/choices for the symbols. This gives the flexibility to the user to configure the symbol with various options and choices within the symbol and user can configure them based on the need. The wizard creator wants to develop a domain template (or object) that contains an associated symbol wizard, so the wizard consumer can build an application that has different representations (e.g., instances) of the same asset. Templates with object and symbol wizard integration capabilities provide an alternative mechanism for creating the same instances with different representation of the same template at design time. A template (or standard) can associate with many different symbol wizards that represent 'Views' of an object. For example, a pump object can have simple view, SA (Situational Awareness) library looking pump, a trend pen, and at least two different type of meters, etc. In this way, the user (e.g., wizard consumer) can select the proper graphic based on the purpose or need without having to create a new instance of the object just to select different options.

Relationships between object and symbol wizard options are described below.

Graphics only options: These symbol wizard options are only for graphics and they don't have any link to object wizard options. These are available for the wizard consumer to fine tune the graphic representation of the object during design time.

Object only options: These object wizard options are only for objects which are driving functionalities on the object shape. They are not associated to any symbol wizard.

Object option drives symbol wizard option selection: These object wizard options are driving a set of option selections on one or multiple symbol wizards. Options from one or multiple symbol wizards that are linked to these object wizard options are not visible to the wizard consumer and can't be configured.

Object option drives symbol wizard option visibility: These object wizard options are driving visibility of symbol wizard options. By setting the object wizard visibility option to true or false will show or hide, respectively, specific symbol wizard option to the wizard consumer.

In an embodiment, the existing symbols cannot be associated with object templates. The user needs to create a symbol for associating with templates. The associated symbol can embed into other existing symbols just like graphic toolbox (GTB) symbols.

In an embodiment, any symbol can potentially be an object wizard. A symbol becomes an object wizard when it contains wizard choices/options and ceases to be an object wizard when the last choice/option is removed. By default, when a symbol is created, it is not an object wizard symbol. The user needs to create wizard choices/options to make the symbol as wizard enabled. Also, if symbol embeds any other wizard symbol, then it is not an object wizard symbol. The symbol itself should have the wizard options/choices to qualify for an object wizard symbol. Upon successful creation of wizard choices/options and configuration, the user can preview (i.e., test) the settings without creating the instance for it.

Associating/linking symbol wizard with object wizard choices and options: By design, any associated symbol of the template can potentially be associated with the object wizard option/choices. FIG. 9 illustrates an exemplary Sequence—Get associated symbols. A wizard developer can associate more than one symbol to the same wizard choice/option and there is no restriction on association. If a symbol is associated with more than one choice/option, the symbol wizard settings can be configured with unique values depending on the selected choice. Settings for associated symbols can also be optionally exposed (e.g., Visibility) within the wizard consumer's editor to be customized for each instance. When a symbol is associated with any choice/option of the object wizard, the visibility of symbol wizard choices/options are set to 'true' by default.

Deleting the object wizard option/choices: The wizard developer can delete the existing object wizard choices/options, which results in deleting all related associated settings from the object. In an embodiment, there is no notification to the user while deleting the object wizard choice or option.

Deleting the associated symbol wizard: When an associated symbol wizard is deleted from the template, the template will not be updated automatically in accordance with one or more embodiments. The system removes the deleted symbol wizard settings from the object automatically when the template is loaded by wizard developer. The behavior is the same as any associated symbol.

Visibility of symbol wizard options to the wizard consumer: The system controls the visibility of the associated symbol wizard options/choices based on object wizard settings set by the wizard creator/developer. This object wizard and symbol wizard integration controls visibility of the symbol wizard choices/options. It doesn't control the visibility of the symbol itself. The symbol is associated with the template and available to the consumer.

Figure 12A:
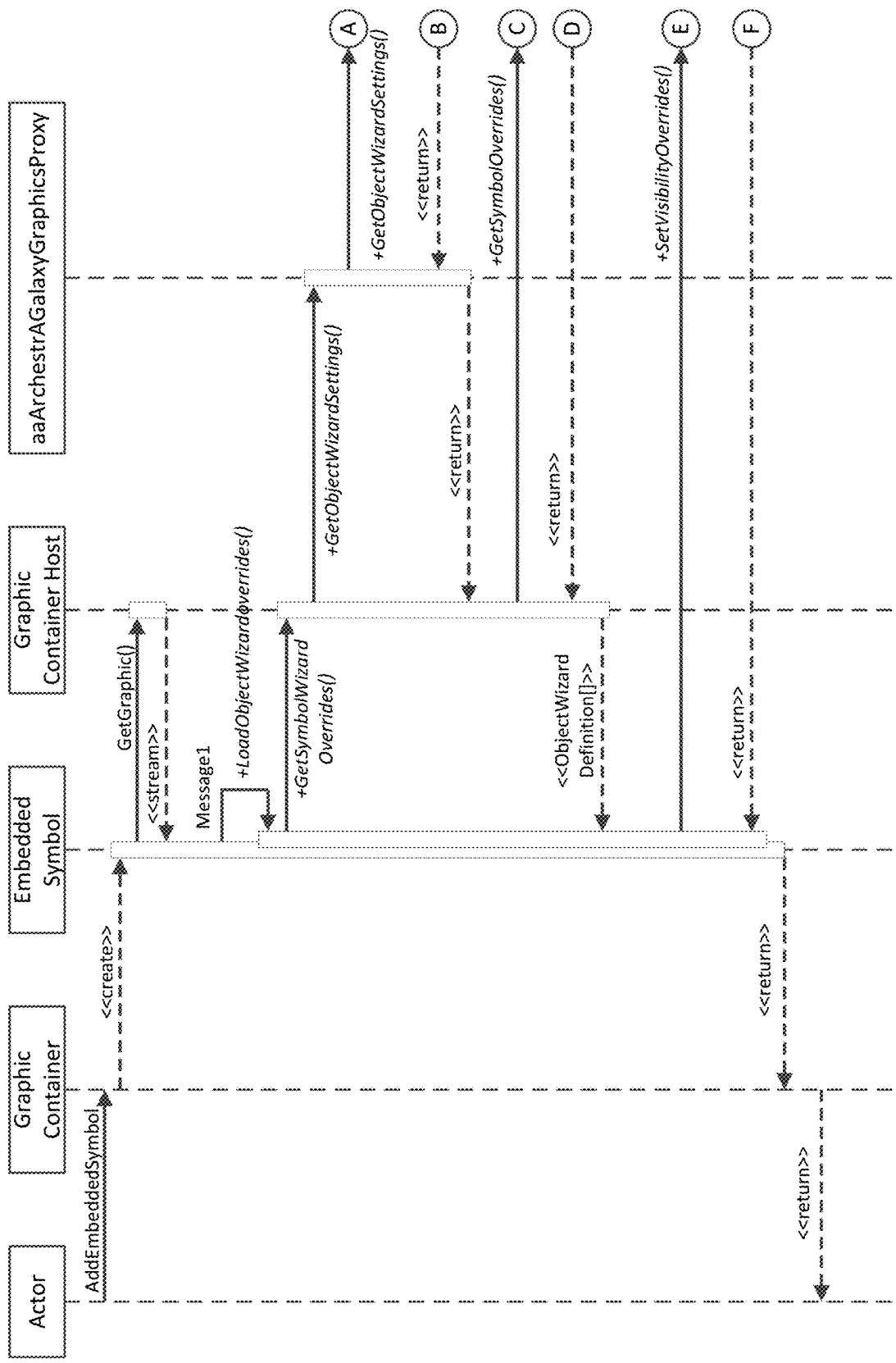
Figure 12B:
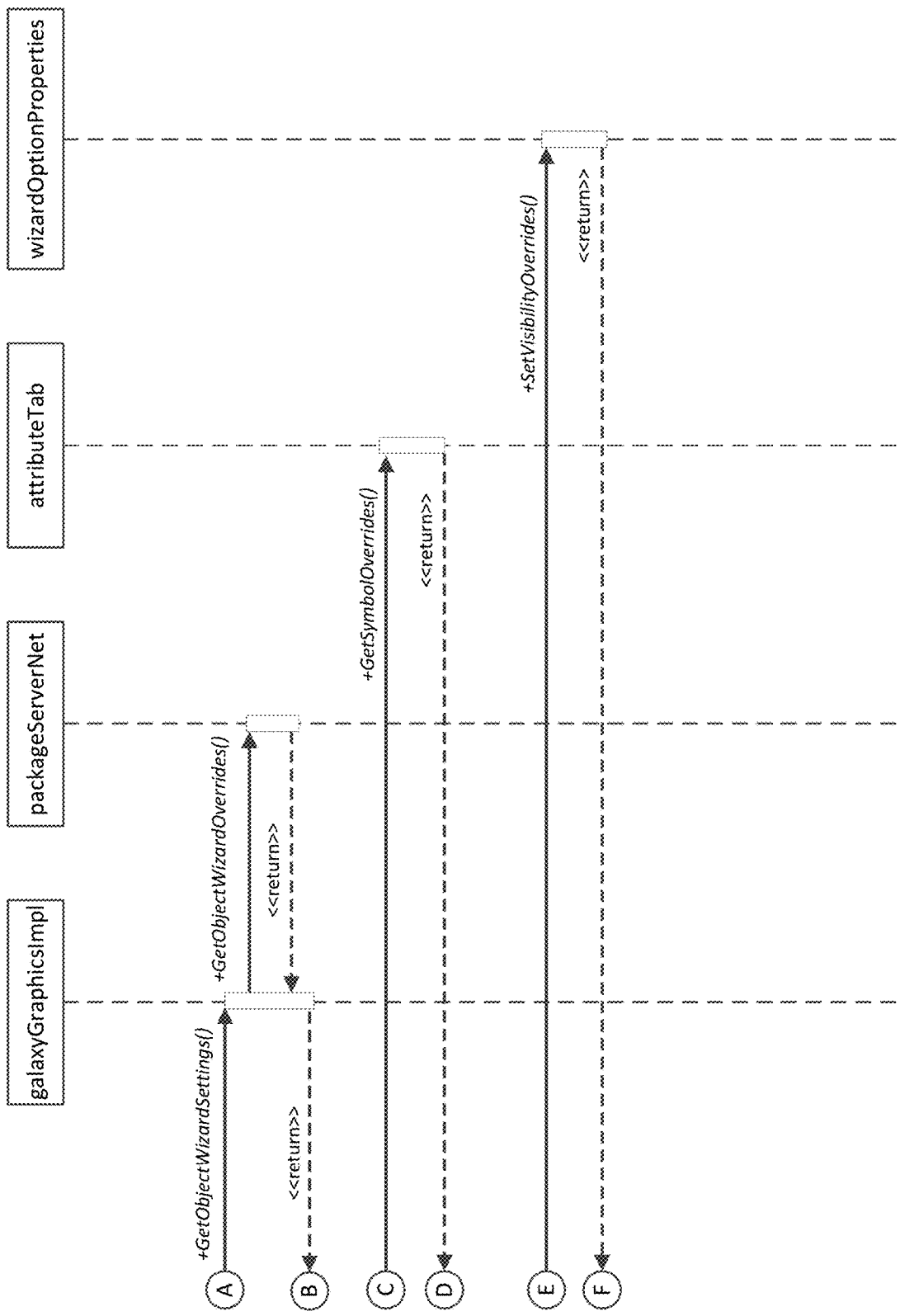
Figure 13:
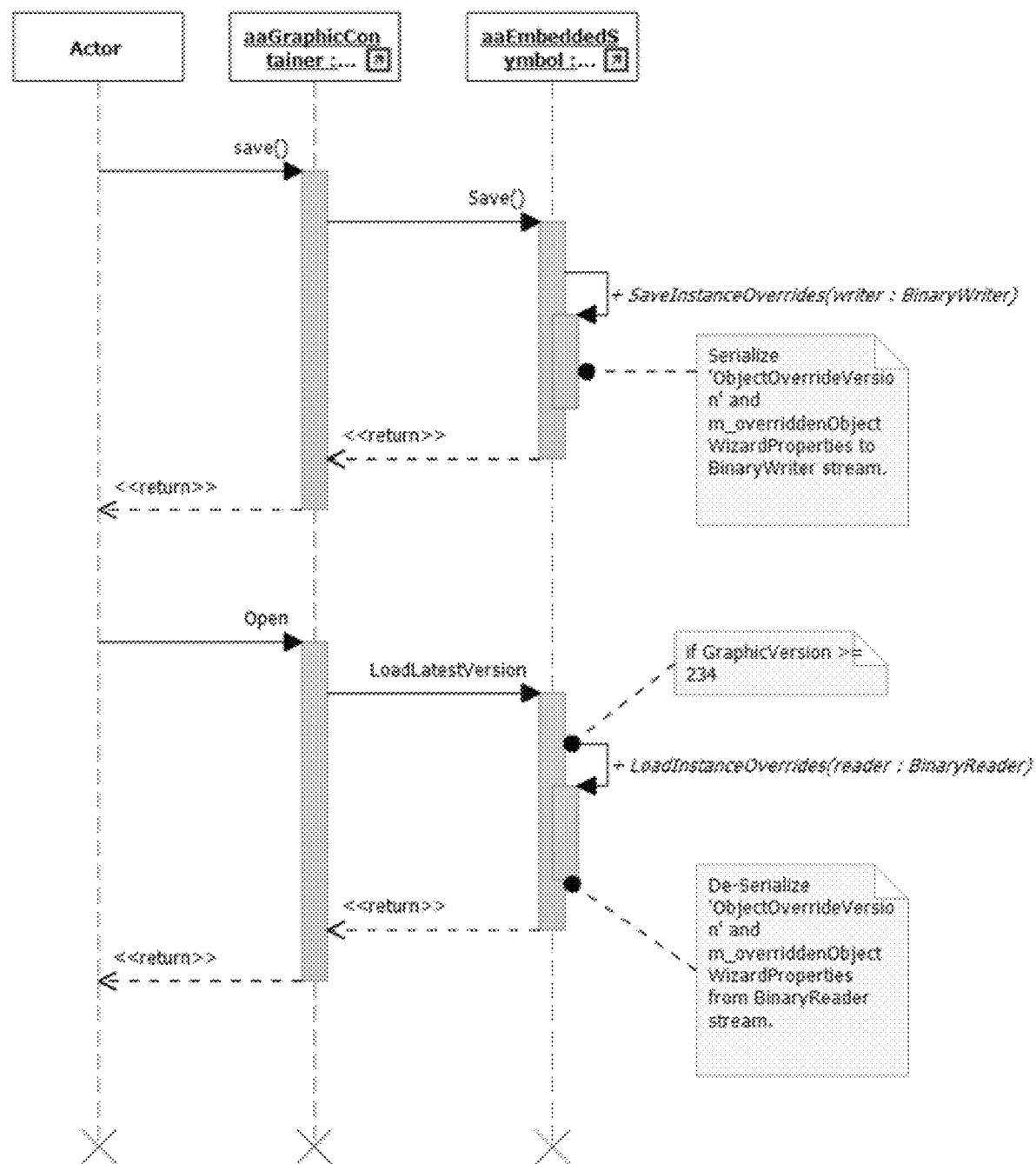
Figure 14:
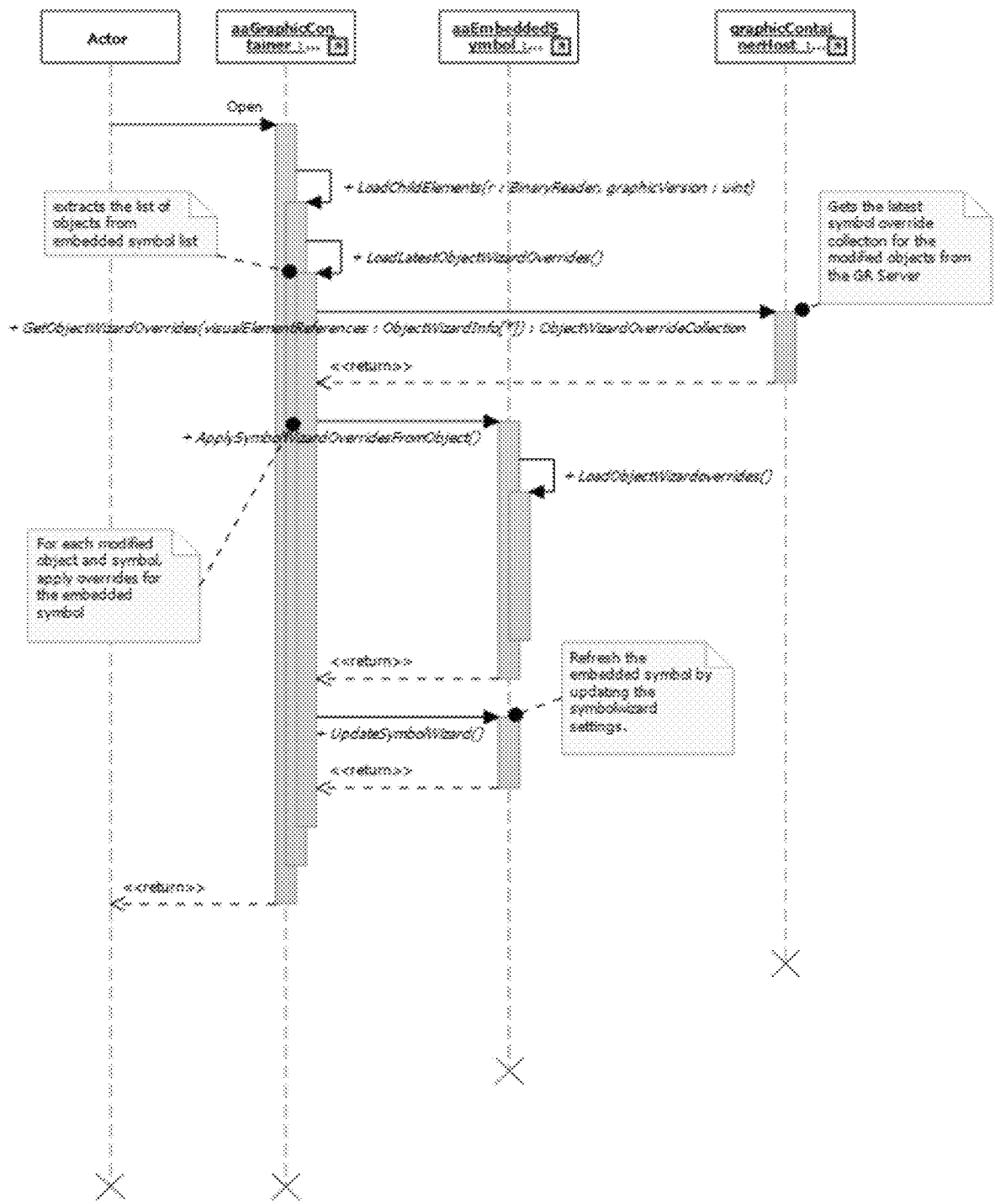

The following describes settings for overriding different values for different options/choices. FIGS. 12A and 12B together illustrate an exemplary Get SW Overrides and FIG. 13 illustrates an exemplary Save and Load Instance Overrides. FIG. 14 illustrates an exemplary Loading Overview Symbols and Applying SW Settings for loading and applying the latest instance overrides for an embedded symbol.

Overriding symbol wizard settings: The wizard developer can override the settings of the associated symbol wizard options/choices at the template level. The modified settings for symbol wizard options will be stored as part of the object itself and the original symbol wizard options for the associated symbol will not be disturbed and the symbol contains the default values. The overridden symbol wizard settings (e.g., choices/options) are not visible to the wizard consumer to modify the settings on the instance or graphic editor.

Overriding Custom Properties of the Symbol: The wizard creator can override the value of custom property of the associated symbol at the template level. The overridden custom property values are stored as part of the object itself and the original symbol will not be modified and the symbol contains the default values. The overridden custom properties of the symbol are not visible to the wizard creator when object symbol is embedded into another graphic.

Overriding Visibility of symbol wizard Choices/Options: If the wizard creator sets the visibility options to 'false' at the template level, then these symbol wizard choices/options will not be available to the wizard consumer. The wizard consumer will see symbol wizard options which are set to visible by the wizard creator. Otherwise these SW options are not visible. By default all SW options will be visible to the wizard consumer unless it is set to invisible by the wizard creator. When the wizard creator overrides the settings for SW, then visibility of SW choices/options are set to "false" and the wizard consumer will not be able to modify. In an embodiment, the SW 'Graphic Only Options' defined by the wizard creator have no overrides in the OW. They are visible to the wizard consumer during visual build configuration.

The below table describes the visibility of SW options to the wizard consumer based on wizard developer/creator settings.

| Wizard Creator Overrides for SW | | Visibility to wizard consumer | |
| --- | --- | --- | --- |
| Value | Visibility | Instance | Embedded Symbol |
| F (No Override) | T (Default) | Can't modify SW options in object instance | T (visible to in the Graphic Editor) |
| T (Overridden value) | F (when user overrides the SW value, the visibility set to false, and the checkbox is disabled for modification. So, it will not be visible to the wizard consumer.) | | F (Overridden SW choices will not be visible in the Graphic Editor) |
| T (Not valid scenario) | T (Not valid scenario) | | N/A |

Testing (Preview) Wizard: The wizard developer will have an option to test the wizard's following behaviors without checking in the template and creating an instance from it:

The impact of Wizard Option and Choice selection on the visibility of other Choice Groups, Choices, and Options of symbol wizard.

The impact of Wizard option and choice selection on the thumbnail update of the SW Overriding the custom property value at design time, doesn't have any impact on the thumbnail or preview. It means that the thumbnail and preview remains same when user overrides the value of the custom property.

Wizard Utilization by the Wizard Consumer: Utilization of the wizard is a similar experience to its Test Mode for SW.

Any changes to the SW settings on the object will reflect a change in the thumbnail generation. One of ordinary skill in the art will understand that graphic rendering may be achieved by any suitable rendering framework and is not limited to drawing thumbnails.

Figure 10:
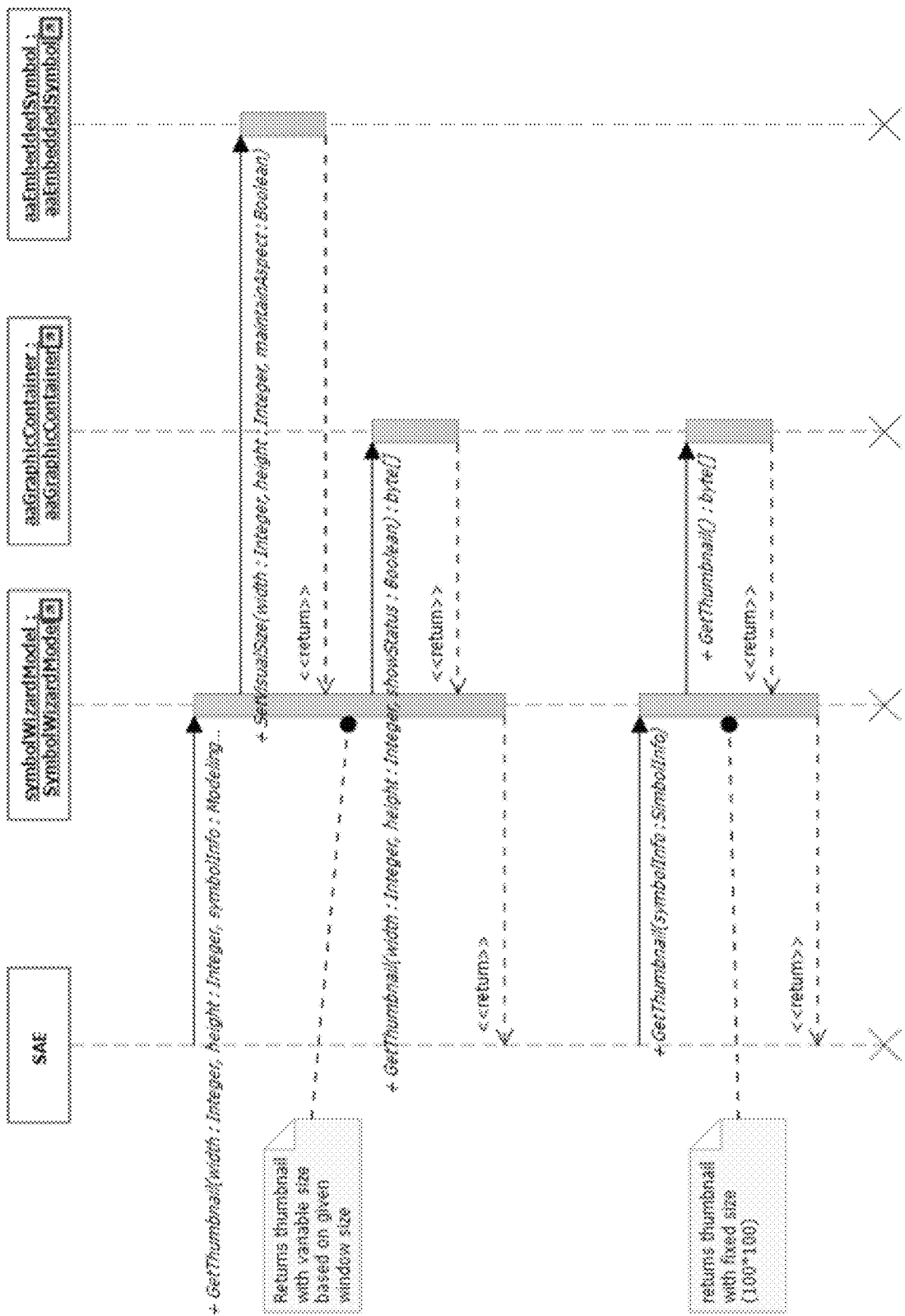

Creating the object instance for given template: This is same as object wizard choice and options. The wizard consumer can change the settings values to refine the object instance based on scenario. These changes will have impact on the symbol wizard settings and the thumbnail will be generated based on the settings. FIG. 10 illustrates an exemplary Sequence—Get thumbnail. Any changes to the SW settings are stored as part of the object instance itself without overriding values in the template. The original symbol will not be modified and it contains the original values.

Embedding associated symbol wizard in another graphic: Configured overridden settings of the symbol (symbol wizard and custom properties) from the OW are applied to the symbol when instance is created for associated symbol. If associated symbol doesn't have any overridden values on the template, then it shows the default values for the symbol wizard settings which are available on the symbol. Any changes to the embedded symbol wizard settings done by the wizard consumer are stored as part of the graphic. The original override values on the object will not be modified.

Saving and opening the overview symbol with embedded symbol: The SW override values are persisted with the symbol while saving the overview-symbol. The overridden values are applied to the symbol while re-opening the symbol.

Apply SW overrides to embedded symbol while re-opening the overview-symbol: The latest symbol override settings of the instance are applied to the embedded symbol while loading the overview or parent symbol if there are any changes to the instance after overview-symbol saved. Otherwise, the symbol is loaded with default saved data.

Propagation Rules for Options and Choice Group Changes: The change propagation for object wizard choices and options is same as discussed above. When the wizard developer modifies the settings for a SW, these changes will be propagated to object instances automatically. The OW_SW changes are propagated to the overview symbols immediately when overview symbol is modified. If the overview symbol is not opened, then the changes are propagated in background and user can publish the overview symbols without opening it. When the wizard consumer loads the associated symbol, the symbol gets the latest override values (e.g., change propagation) from the object and applies them to it. Object wizards in accordance with an embodiment of the disclosure enable automatic propagation of changes for unlocked element values (i.e., value locking is no longer required). In an embodiment, propagation of changes are prevented if a value is explicitly configured (e.g., overridden) within the derived standard on instance prior to the change to the underlying standard.

Figure 3:
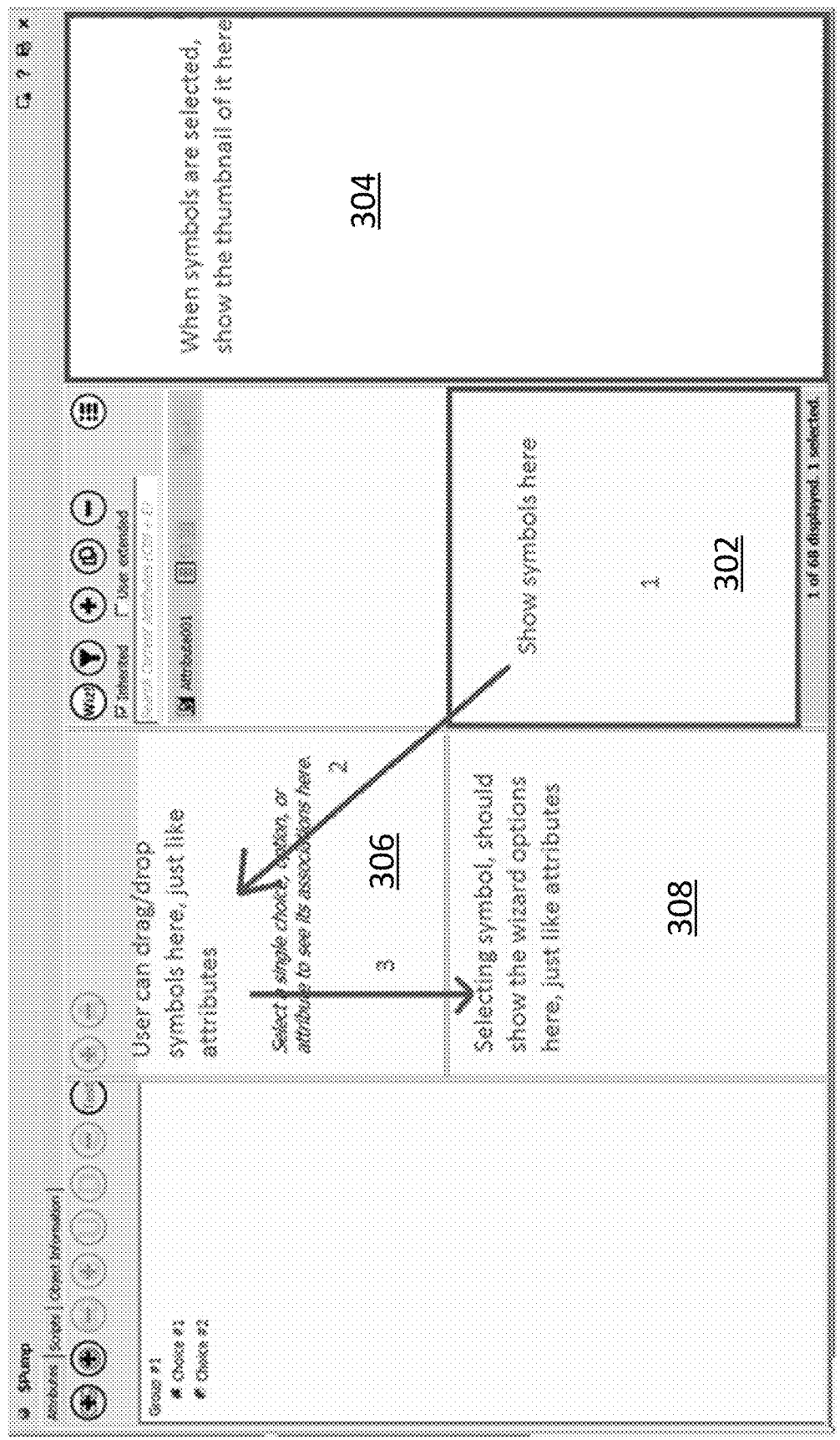
FIG. 3 is an exemplary mock up for showing symbols according to an embodiment.

Modify the SAE editor to show list of associated symbols: The SAE (Simplified Attribute Editor) is modified to show the list of associated object symbols as part of the editor along with attributes in ascending order of symbol name. An exemplary screenshot of the symbols is illustrated in FIG. 3. In an embodiment, a symbol list pane 302 shows a relatively tiny thumbnail (e.g., of size 100×100 pixels) of the symbol along with symbol name. In an embodiment, the symbol list pane 302 comprises an application object template library. By selecting a symbol list item, a details pane 304 will show an actual thumbnail based on the window width and height of the image control. The user can drag/drop symbols into an association pane 306, which shows the wizard options in an options pane 308.

Figure 4:
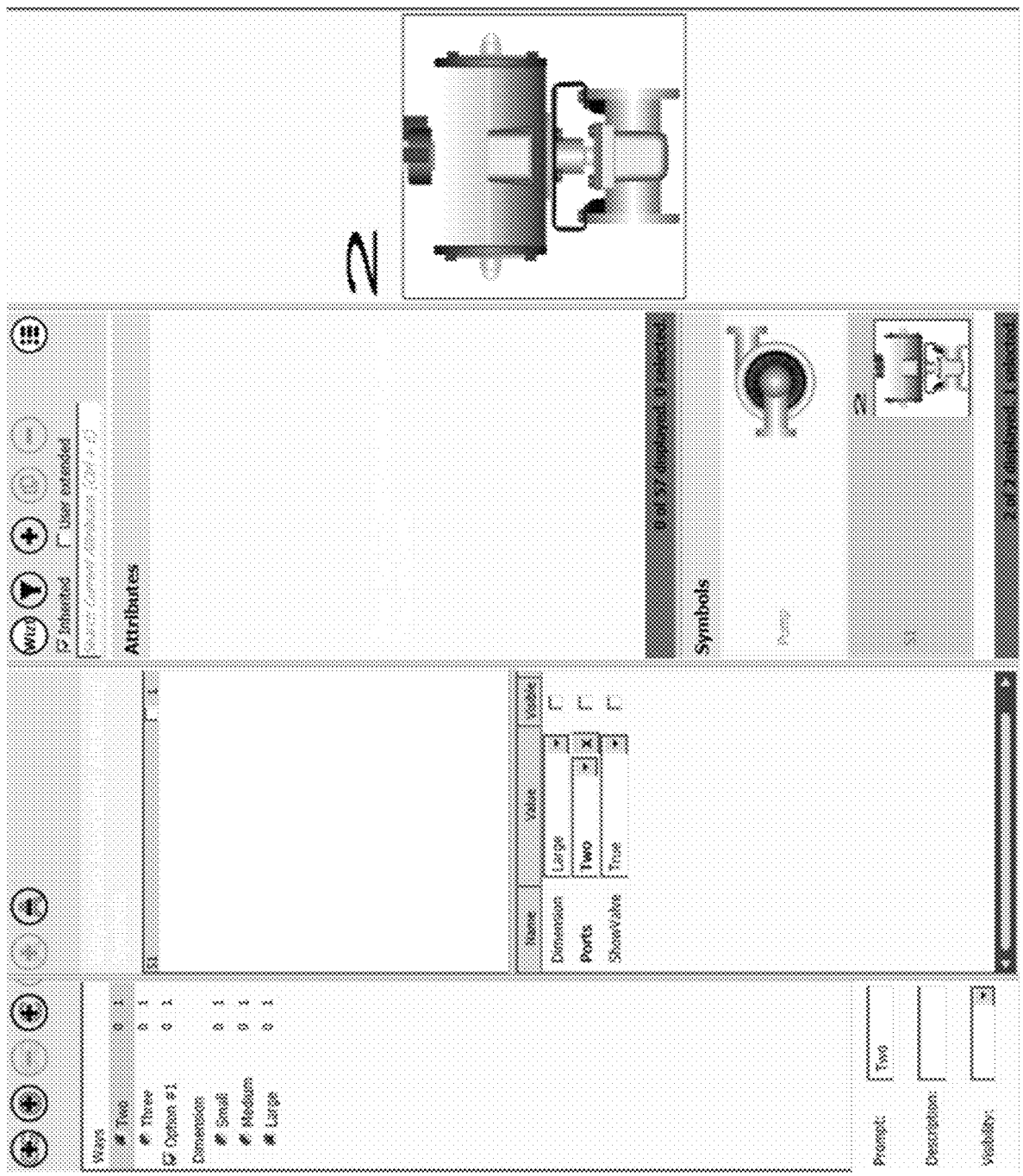
FIG. 4 is an exemplary screenshot showing an implementation for the mockup of FIG. 3.
Figure 5A:
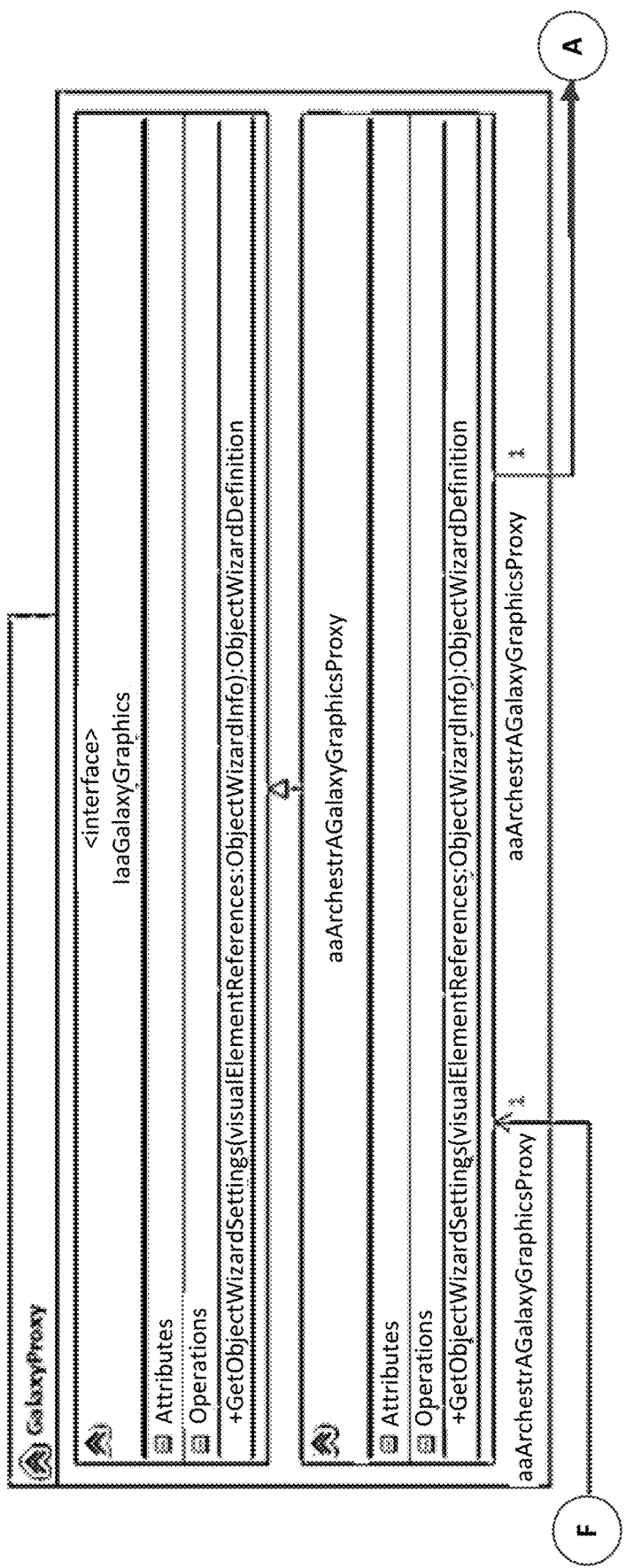
FIGS. 5A-5E are an exemplary class diagram illustrating dependencies for integrating a symbol configuration utility with object configuration utilities according to an embodiment.
Figure 5B:
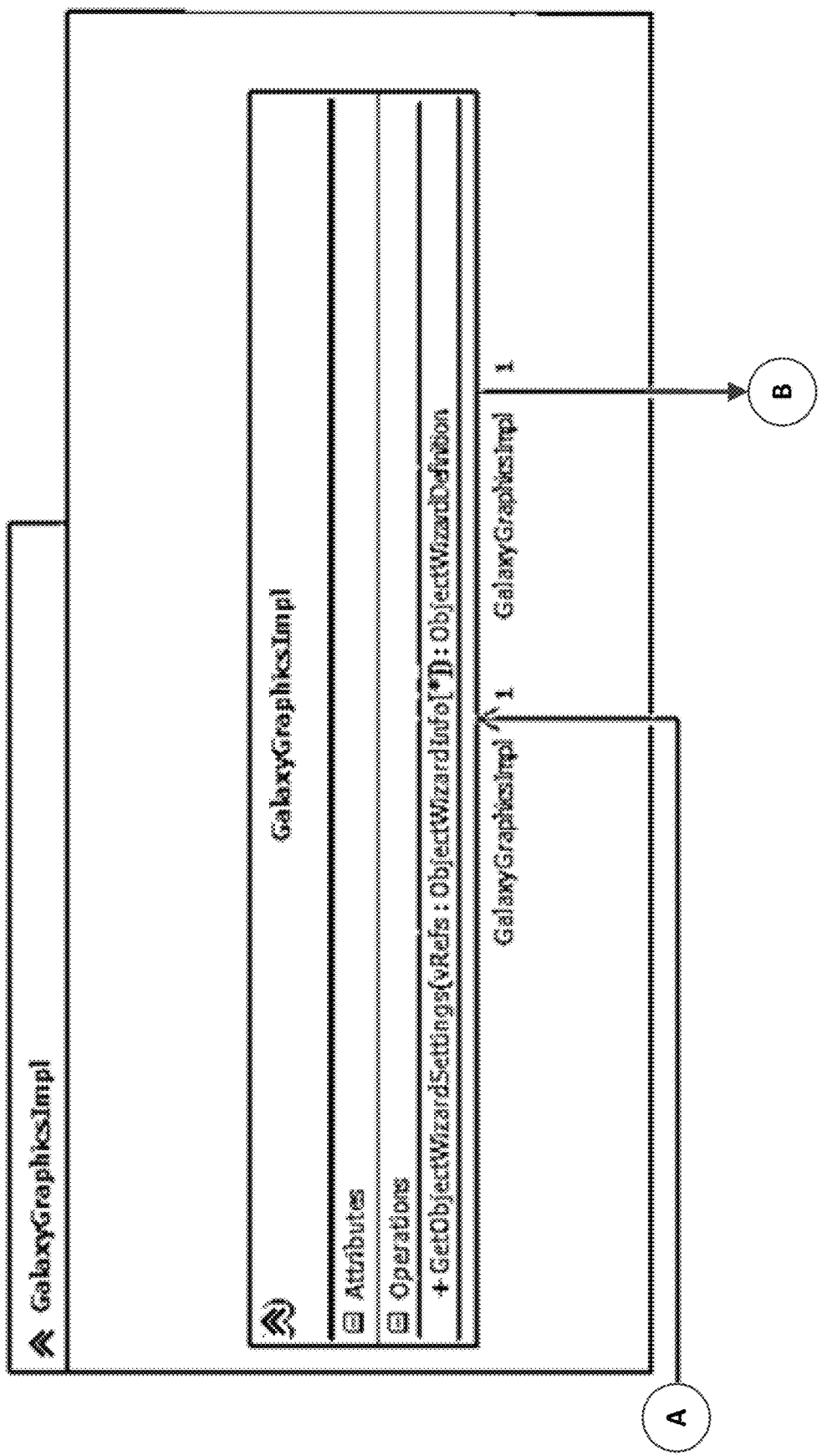
Figure 5C:
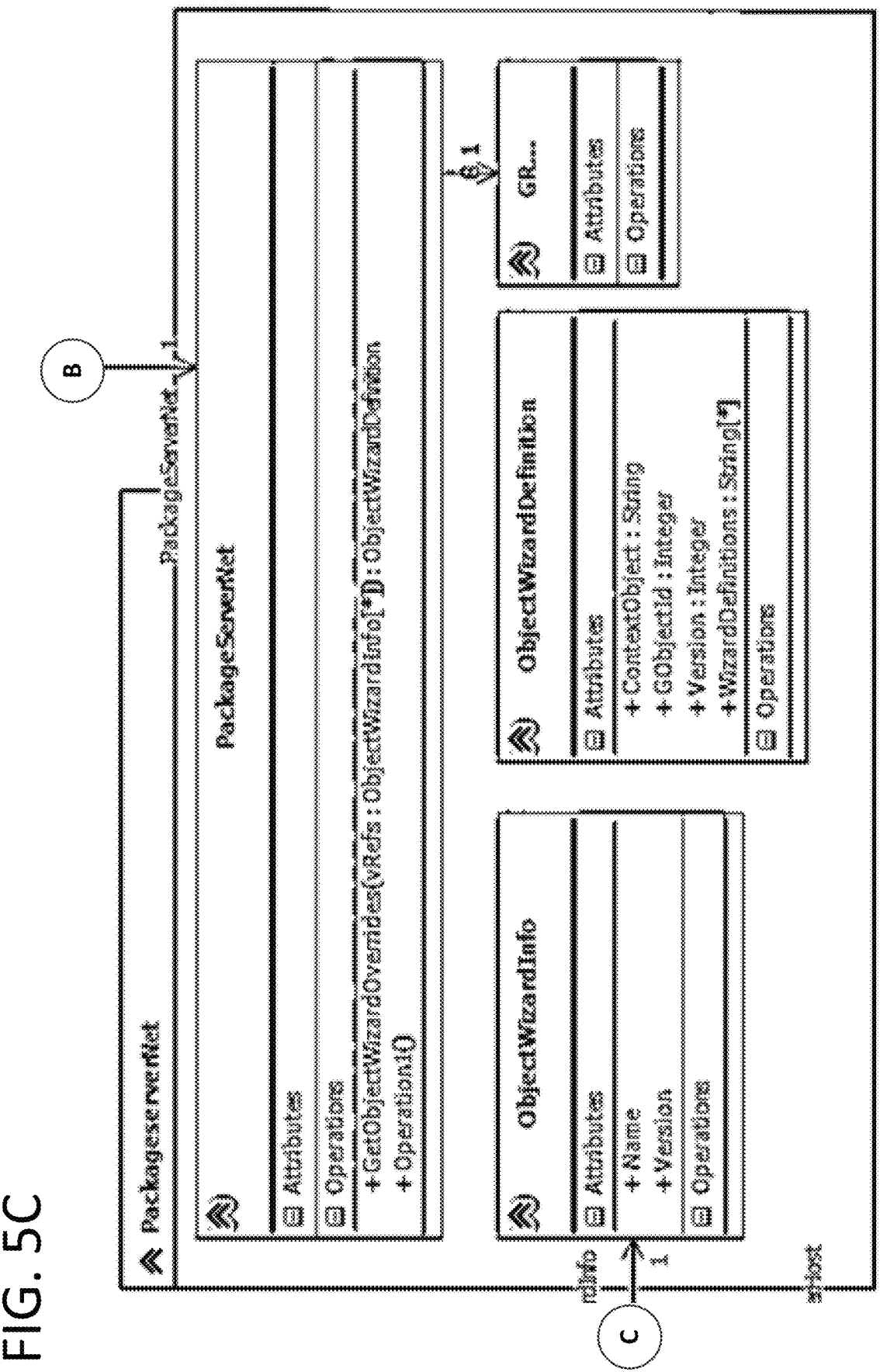
Figure 5D:
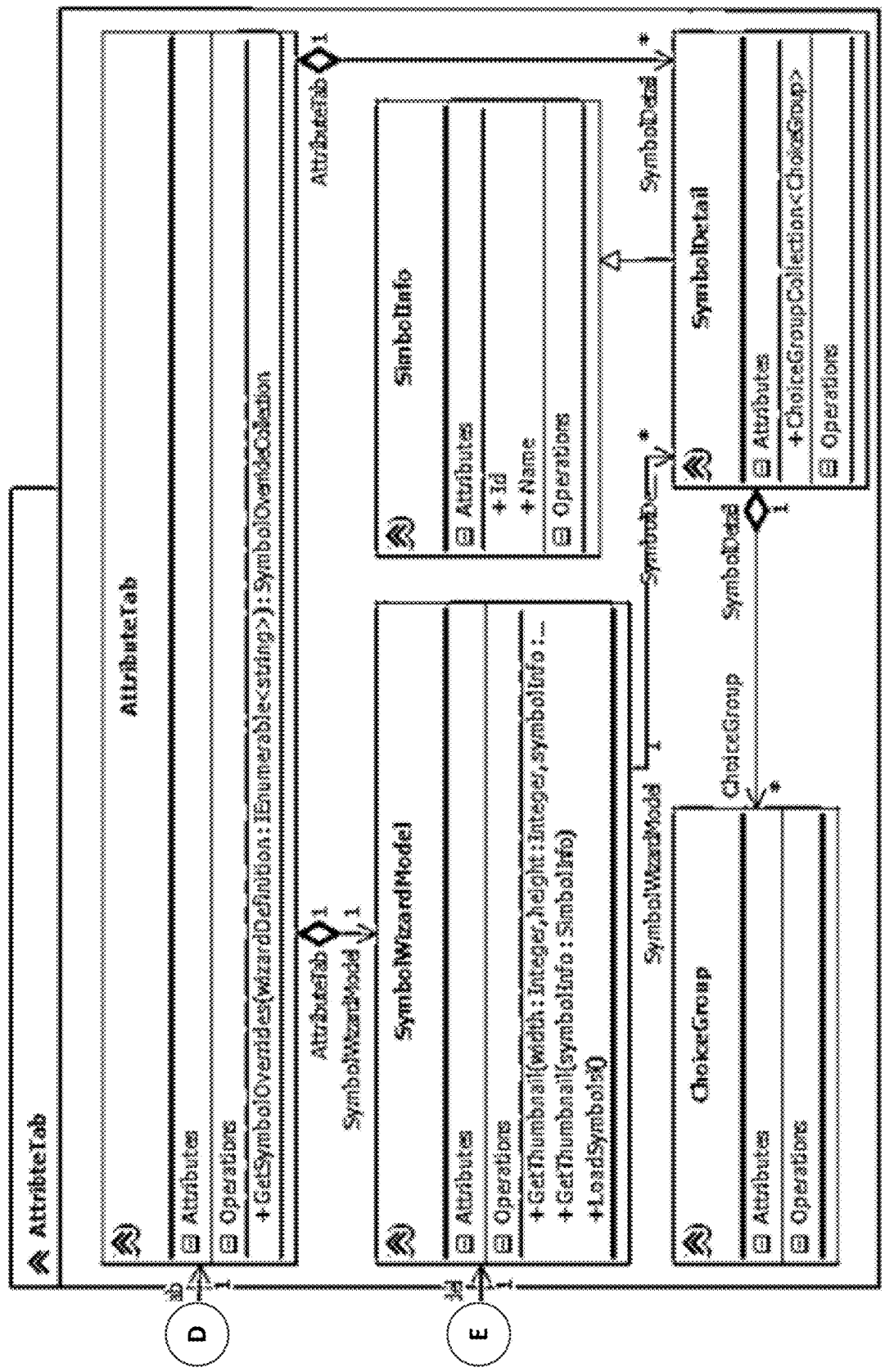
Figure 5E:
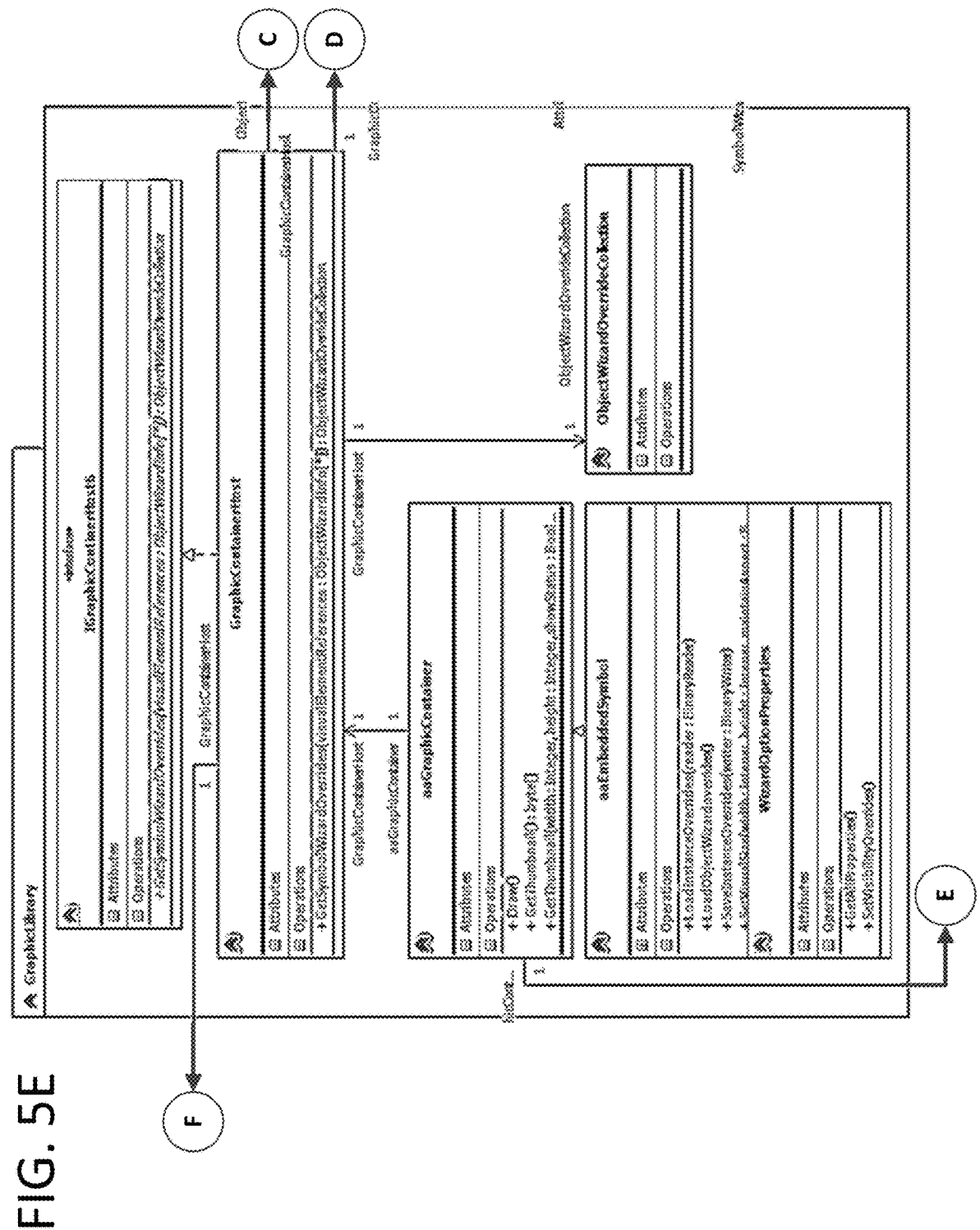

FIG. 4 is an exemplary screenshot illustrating an implementation for the exemplary screenshot of FIG. 3. In this screenshot, the symbol list pane 302 shows two symbols ("Pump" and "S1"), and the details pane 304 shows a thumbnail of the symbol selected in the symbol list pane 302 (i.e., thumbnail of "S1").

Associate SW with OW choices/options: The user can associate the symbols with object wizard choices and options just like attributes. After associating the symbols, the user can override the symbol wizard settings based on requirements. These override settings are stored as part of the object in the project database table. The system (e.g., system 100, HMI 120, etc.) returns a list of all symbol wizard options/choices during configuration without applying the rules. This is used by the wizard creator to configure the domain template with symbol wizard options/choices.

Save object wizard settings as part of object: The wizard settings for an object are stored as part of the "_WizardDefinition_*" dynamic attribute. Here, the '*' represents the level of the object. For example, if a user creates the wizard settings at a first level of derivation template, then the template has a dynamic attribute '_WizardDefinition_1'. Similarly, if a user creates an instance for this template, then the instance contains two dynamic attributes '_WizardDefinition_1' and '_WizardDefinition_2'. This dynamic attribute is stored in the 'dynamic_attribute' table of project database. This enables getting the wizard settings data directly from the database without loading the actual automation object to avoid performance delay in loading the object. So, the wizard settings can be retrieved directly from the database without object.

Save SW override values as part of object: As per the current implementation, the wizard settings are stored as part of '_WizardDefinition_*' attribute of object. In order to improve the performance and load time of the SW (symbol wizard) override settings from the object, additional dynamic attribute '_SymbolOverrides' is added to the object to contain the symbol override settings. This attribute contains the settings in the format of an XML string. Accordingly, client devices can read this XML string directly without loading the object to get the symbol overrides, which improves performance of the computing device(s).

Override the SW settings: The overridden settings are applied to the associated symbol when the wizard consumer embeds the associated symbol in to other graphic of the object. The system internally gets the override values and applies to the associated symbol while embedding without any user action. When the symbol is shown on the container (i.e. other symbol), by default it shows with override values.

Override visibility of the SW choices/options: The wizard developer can control the visibility of the symbol wizard settings to the wizard consumer.

Change propagations: When the wizard developer modifies the settings to the template, the changes are propagated to the derived instances immediately. But these changes will not be propagated to the associated symbols, which are embedded in other graphics, immediately. The user needs to re-open the container symbol in order to get the latest changes from the instance. In this case, if the graphic editor is opened while modifying the SW settings for the object, then the changes for the embedding symbol are propagated immediately to the overview symbol and the user can take action of whether to apply the changes or not without re-opening the symbol.

Save and load object wizard override values for embedding symbol: The overridden settings of the embedding symbol are stored as part of the container symbol while saving it to persist object wizard overrides. The settings are loaded while re-opening the container symbol to restore the settings of the object wizard overrides for the embedding symbol.

Module Decomposition: The following identifies and describes the modules contained in an embodiment of the disclosure.

Symbol Wizard Model Description: Symbol Wizard Model, in an embodiment, is a type of a .Net class. One purpose of this module is to interact with Graphic Library components for loading the visual element data. This module is responsible for finding an associated symbol using the underlying platform. Also, this module generates the thumbnail for the symbol based on the wizard settings modified the by the wizard developer.

Attribute Tab Description: Attribute Tab, in an embodiment, is a type of a .Net managed assembly. One purpose of this module is to interact with the Symbol Wizard Model to get the object symbol information. Also, this module is responsible for serializing and de-serializing the wizard settings data from the XML files. This module is responsible for getting the symbols and showing them on the SAE editor. Also, this module is responsible for associating the symbol wizard choices/options with the object wizard and overrides the settings for SW.

Graphics Implementation Description: A graphics implementation, such as GalaxyGraphicsImpl, in an embodiment, is a type of .Net managed code. One purpose of this module is to interact with the IPackageServerNet component, for example, for visual element operations. This module is responsible for getting the visual element (e.g., graphics) data from the data base by using the IPackageServerNet component. This component implements interface methods to get the associated object wizard settings from the database.

Graphic Library Description: Graphic Library, in an embodiment, is a type of .Net managed assembly. One purpose of this module is to interact with a graphics interface to get the visual element data and embed the associated symbol as part of the container. This module is responsible for loading the embedded symbol from the database and rendering the graphic element on to the container. Also, this module loads symbol wizard choices and options for the selected symbol.

Galaxy Proxy Description: Galaxy Proxy, in an embodiment, is a type of .Net managed assembly. This module is a proxy between the Graphic Library and GalaxyGraphicsImpl modules. This module is responsible for getting Visual Element data from the server (e.g., application server) and passing it to the clients.

Package Server Net Description: Package Server Net, in an embodiment, is a type of .Net managed assembly. This module is a wrapper to the server database and gets the data based on request by the clients. This module is responsible for getting Visual Element data from the database and passes it to the GalaxyGraphicsImpl Module.

The following dependency description specifies the relationships among entities. It identifies the dependent entities, describes their coupling, and identifies the required resources. This section defines the strategies for interactions among design entities and provides the information needed to easily perceive how, why, where, and at what level system actions occur. It specifies the type of relationships that exist among the entities such as shared information, prescribed order of execution, or well-defined parameter interfaces. The dependency description provides an overall picture of how the system works in order to assess the impact of requirements and design changes. It can help maintainers to isolate entities causing system failures or resource bottlenecks. It can aid in producing the system integration plan by identifying the entities that are needed by other entities and that should be developed first. This description can also be used by integration testing to aid in the production of integration test cases.

The following module dependencies subsection identifies and describes all of the inter module dependencies.

Figure 6:
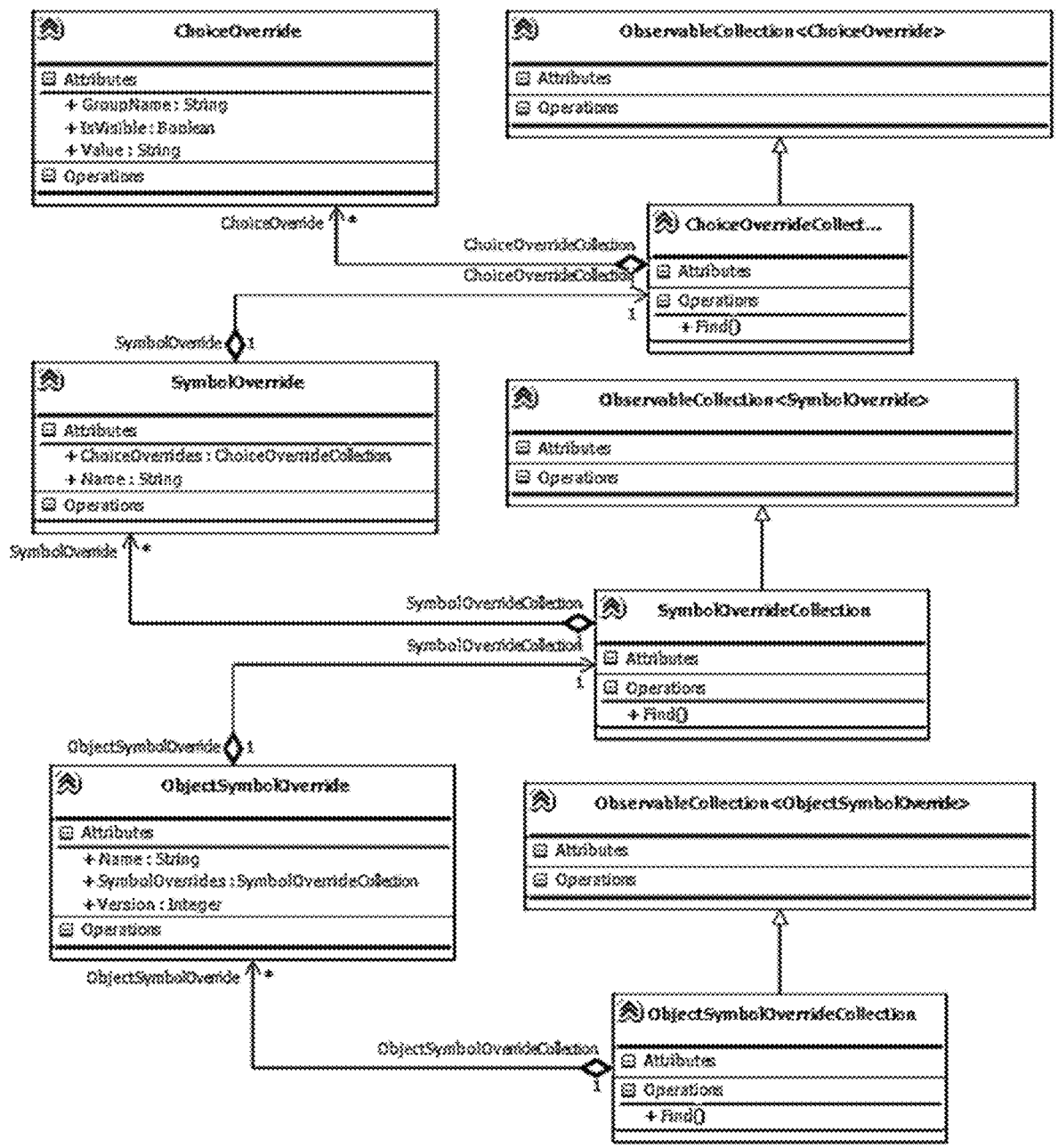
FIG. 6 is an exemplary class diagram illustrating symbol configuration utility overrides according to an embodiment.
Figure 7:
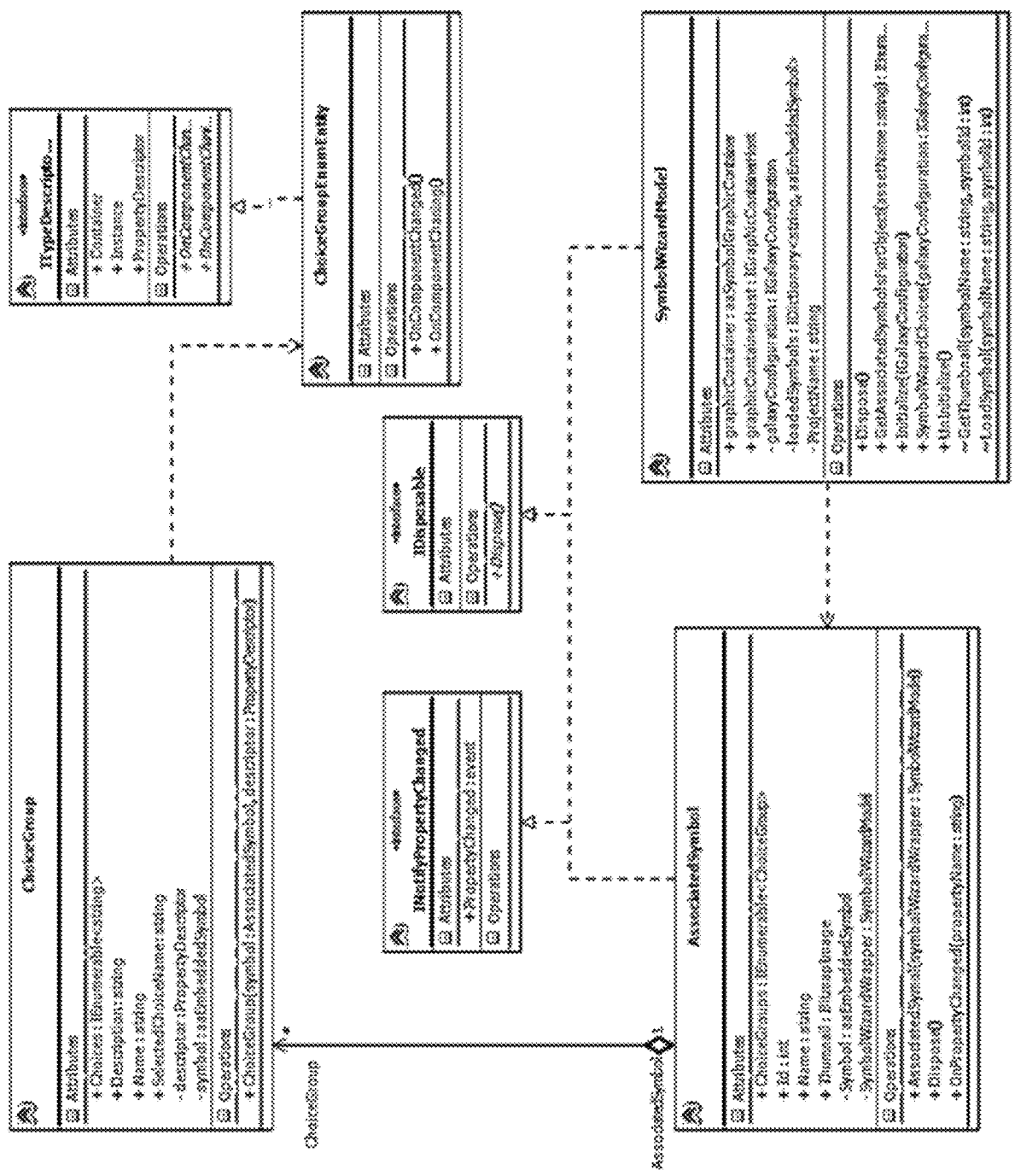
FIG. 7 is an exemplary class diagram illustrating symbol configuration utility dependencies according to an embodiment.

Overall OW and SW Dependencies: FIGS. 5A-5E illustrate a class diagram describing dependencies for integrating symbol wizard with object wizards. It shows all the classes that are part of the symbol wizard integration with object wizards. FIG. 6 is a class diagram illustrating symbol wizard overrides. This class diagram shows the interaction among the various symbol wizard override classes. FIG. 7 is a class diagram illustrating SymbolWizardModel dependencies. It shows the interaction of various symbol wizard classes as part of the AttributeTab component.

The following interface description includes details of external and internal interfaces according to an embodiment.

ObjectWizardInfo structure: This structure contains the object information which is used to get the object wizard definitions from the server. In an embodiment, the structure includes fields for a visual element reference of they symbol and symbol wizard overrides.

ObjectWizardDefinition structure: This structure contains wizard information for the target object. In an embodiment, the structure includes fields for an object identifier of the target object, a tag name of the object, a value of _Wizarddefinition_* in an XML string, and a checked-in package identifier of the object.

IGalaxyGraphicsV13 Interface: This interface is modified to have an additional method for getting the object wizard settings from GalaxyGraphicsImpl component.

The 'Get object wizard Settings' function takes an input of list of object names, extracts the wizard settings for given object using the IPackageServerNet component. The wizard settings are stored in the database by serializing into a memory stream which is originally type of MxValue containing string value. This function de-serializes the memory stream into MxValue and sends the output in the form on string. In an embodiment, the syntax includes an input array of structures having the objects and their corresponding checked-in package identifiers for which wizard definition attribute values should be retrieved, and an array of structures having the override information for the wizard definition attributes of objects.

Interface: The graphic library client calls the 'GetObjectWizardSettings' method providing the reference object name, otherwise the output will be an empty string.

IPackageServerNet Interface: This interface is extended to have additional method for getting the object wizard settings from the PackageServerNet component.

The 'Get object wizard Settings' function takes an input of list of objet names, extracts the wizard settings for given object by connecting to the data source directly. This method returns list of strings for each wizard definition attribute. In an embodiment, the syntax includes an instance of an existing galaxy connection, a list of object information for getting the wizard definitions, a list of object wizard definition values for the target objects, a count of response size, and an operation status.

The GalaxyGraphicsImpl component calls the 'GetObjectWizardSettings' method providing the reference object name, otherwise the output will be an empty string.

IaaGalaxyGraphics Interface: This interface is modified to have additional method for getting the object wizard overrides settings from the IGalaxyGraphics component.

The 'Get object wizard Settings' function takes in input of object name and gets the object overrides by using the IGalxyGraphics component. This method returns the list of object wizard definitions for the given list of objects. In an embodiment, the syntax includes a list of target object information, an error code, and a status message.

The GraphicContainerHost component calls 'GetObjectWizardSettings' method providing the reference object name.

IGraphicContainerHost6 Interface: This interface is modified to have additional method for getting the symbol wizard overrides for the target context object from the server.

The 'Get symbol wizard Overrides' method takes an input of context object info and returns list of symbol wizard overrides for each given context object. In an embodiment, the syntax includes a target list of context object information. This is internal to the GraphicLibrary component. The graphic containers or an embedded symbol uses IGraphicContainerHost to interact with the proxy for getting the symbol wizard overrides for given object from the server. The 'Get Symbol Override' method takes an input of context object info and returns symbol wizard override for given symbol name. In an embodiment, syntax includes a target list of context object information, and a name of the target symbol.

IConfigurationEditorSite6 Interface: This interface is modified to have an additional method for updating the modified symbol info to the FsObject while saving it, which internally updates the timestamp of corresponding Visual Element to invoke change propagation event to the subscribed graphic editors. The 'UpdateSymbols' method takes an input of modified symbol names and returns HRESULT status. In an embodiment, the syntax includes a target list of context object information. This method takes array of symbol names which are modified by object wizard settings for the selected instance. Internally, the FsObject uses this symbol name to find out the visual element and updates the timestamp of it to trigger the change propagation to all of the subscribed graphic editors. The AttributeTab will be calling this method while saving the wizard data to update the modified symbols based on the wizard settings.

The following detailed design section contains the internal details of each design entity. This description contains the details needed by programmers prior to implementation. The detailed design description can also be used to aid in producing unit test plans.

AttributeTab Detail: This component is responsible for serializing and de-serializing the object wizard data while saving and loading it. This class loads the given wizard data and returns the list of choice groups and overridden values for the object. The below static method is exposed by this component which will be used by the clients. In this design, the GraphicContainerHost uses this component to get the symbol wizard overrides for given wizard definition data. In an embodiment, the syntax includes a list of wizard definitions. In accordance with an embodiment of the disclosure, the wizard settings data is stored in xml format using the Xaml serialization technique. Based on the performance impact, this serialization may change in the future without affecting other modules.

SymbolWizardModel Detail: This is a managed class. This class is instantiated by the client (i.e., SAE) passing IConfigurationEditorSite instance as an input parameter. This module contains list of associated symbols loaded for the object and provides the data for the selected symbol. This component internally subscribes to the symbol events (SymbolAdded, SymbolRemoved, SymbolModified, SymbolRenamed) of the GObject to get the symbol extension info from the FsObject instead of using the Association Browsing service.

SymbolDetail Detail: This is a managed class. This class is instantiated by the SymbolWizardModel class to contain associated symbol information of the selected object. This module contains the symbol data like name, identifier (ID), and list of choice groups of the associated symbol. It generates a thumbnail based on current selection of the symbol and provides it to the clients.

GalaxyGraphicsImpl Detail: This component implements the IGalaxyGraphicsV13::GetObjectWizardSymbolSettings( ) interface method which is available in the ArchestrA.Configuration.GalaxyGraphics.dll interop assembly. For given list of input object names, it verifies the existence of the object name by using the IPackageServerNet component. If the object is available in the project, then it retrieves the object wizard settings for the given object. This method extracts the object overrides from the data base in form of memory stream. After successful retrieval, it de-serializes this into MxValue and returns the string value it.

aaArchestrAGalaxyGraphicsProxy Detail: This component implements the IaaGalaxyGraphics::GetObjectWizardSettings( ) interface method which is available in the ArchestrA.Visualization.GraphicLibraryInternal.dll assembly. For a given input object name, it gets the object wizard override settings by using the IGalaxyGraphics component. This method returns the list of wizard definitions to the caller.

aaGraphicContainerHost: This component implements the IGraphicContainerHost::GetSymbolWizardOverrides( ) and GetSymbolOverride( ) interface methods. This component interacts with IaaGalaxyGraphicsProxy interface to get the list of wizard definitions for given context objects and returns collection of symbol wizard overrides for each of them. This component maintains the local cache for all associated symbols of the given object. When GraphicContainer requests for a symbol to get the SW override settings, it returns the local cached values instead of getting from the server. This cache is updated first time when it is loaded from the server for an object. This method parses the output wizard definition data given by the IGalaxyGraphics component and returns the SW override data for the clients. Internally it uses the 'AttributeTab' (using Reflection) to load wizard definitions for each object and gets the symbol wizard overrides which will be returned to the caller.

aaGraphicVersion: This component is modified to bump up the graphic version to 234 for serializing and de-serializing the SW overrides from the object while saving the graphic container.

aaEmbeddedSymbol—'LoadSymbolWizardOverrides': The constructor of this component is modified to load the symbol wizard overrides from the context object. It uses GraphicContainerHost to get the list of SW overrides from the server and applies to the symbol while loading the symbol in the constructor. In an embodiment, the syntax includes a name of the context object of the symbol, a name of the symbol, and an object version of the symbol. This method extracts the override settings for the target symbol from the output data returned by the container host. If SW overrides exist, then it updates the internally list 'm_overriddenWizardProperties' with list overridden values. The symbol is updated with override values after loading the symbol while drawing it. Also, it updates the 'OptionDynamicProperties' with list of visibility rules of SW choices and options to control the visibility of choices to the user for further configuration.

'GetAllWizardOptions': This component is modified to have public method 'GetAllWizardOptions' for getting list of all wizard options for the symbol during configuration. The SymbolWizardModel component (as part of AttributesTab.dll) uses this method to override the SW settings during configuration of domain templates. In an embodiment, the syntax includes an instance of the wizard option properties. This method internally uses the 'OptionDynamicProperties' component to get list of all wizard properties for the symbol and return them to the caller.

'SaveInstanceOverrides': This component is modified to persist the symbol wizard override settings of the embedded symbol while saving the container symbol. It saves the 'OverrideVersion' and 'Visibility' of the symbol wizard options, so it can be restored while re-opening the container symbol. In an embodiment, the syntax includes a save object version, a save object wizard overrides, a save symbol wizard name, and a save visibility of symbol wizard. This method internally serializes the object overridden version and settings to the BinaryWriter (blob) which in turn stored as part of the parent symbol. This data will be restored while re-opening the symbol.

'LoadInstanceOverrides': In an embodiment, the syntax includes a read context object version and a get total number of overridden properties. This method internally de-serializes the object overridden version and visibility of SW settings from the BinaryReader (blob) which is used to restore the object wizard overrides from the object apply them to the embedding symbol.

OptionDynamicProperties: This component contains the list of wizard choices and options for the target symbol. This is generated dynamically to load and save the wizard options from the stream which is part of the target symbol. This is modified to have additional method 'GetAllProperties' to get all of the wizard properties for the target symbol. This method is used by the SymbolWizardModel during association of symbol wizard with object wizard choices/options during while developing the domain templates. In an embodiment, a method extracts the list of available wizard properties for the target symbol without applying the visibility rules and returns same thing to the caller.

aaGraphicContainer—Load Latest Object Wizard Overrides: This method is responsible for getting the latest symbol override settings for from the server and update the embedded symbols with latest settings. This method is called from LoadChildElements( ) method after loading the all of the child elements the overview symbol (i.e. symbol which is containing the embedded symbols). In an embodiment, the syntax includes populating a list of object wizard information from a graphic element name map, a call to a container host to get the symbol override settings for an array of object information, getting the embedded symbols for each object in the list of objects to be updated, updating each embedded object, and making the container dirty to enable saving. Internally, it populates the list of context object information from each embedded symbol. It passes this list of objects to the container host to get the object wizard overrides for all of objects at single shot. Hence, multiple calls to the server for getting the override settings can be avoided to improve responsiveness of the system.

GetThumbnail: This component is modified to update the thumbnail based on actual window size of the container. The SAE requests this component to get the thumbnail based on window size which will be shown to the user during refinement of wizard choices/options. In an embodiment, the syntax includes an actual width of the container that is rendering the graphic, an actual height of the container that is rendering the graphic, and a flag value to show a status graphic as part of the container. In an embodiment, a method modifies size of the actual symbol and returns the thumbnail based on given window size. It applies the transform to enlarge or shrink the actual graphic element and converts the image into a bitmap which will be returned to the user in the format of byte.

PackageServerNet detailed design: This component retrieves the symbol override settings from the database for given target object name. This method internally executes the stored procedure "to get the SW overrides from the attribute." In an embodiment, the syntax includes an instance of the galaxy connection object, a list of objects, a return list of object wizard overrides, a length of the response size, a status of operation, creating a temporary file with input data, executing the stored procedure, de-serializing the wizard settings and populating the output data, and returning the data. In an embodiment, a method processes the input data which contains the visual element reference (i.e., object.symbol) and prepares the temporary file with list of object names. This method executes the stored procedures by passing the list of object names and its versions. The stored procedure returns the data set with wizard information for matching object names. If there is no change to the object version, then it returns empty data set. It compares input data symbol data with result data set using the Xml Reader to make sure that there is a change to the symbol. If there are no changes to any symbol of the object, then it returns empty string, otherwise it returns entire symbol list (i.e. MxValue of _SymbolOverrides attribute).

GObject detailed design: This is a model class internal to the AttributeTab component which is a wrapper to FsObject component. This component is responsible for getting the FsObject information like attributes, extensions and listening to change propagation events to the FsObject component. This class will be modified to populate the symbol extension information and invoke corresponding events to SymbolWizardModel. Internally it parses the .Extensions and ._InheritedExtensions attributes values and extracts the SymbolExtension info to populate the collection of the symbols. These symbols will be sent to the symbol wizard model to process them and load the symbol data.

The following Sequence diagrams subsection describes the design of each process identified above.

Figure 8:
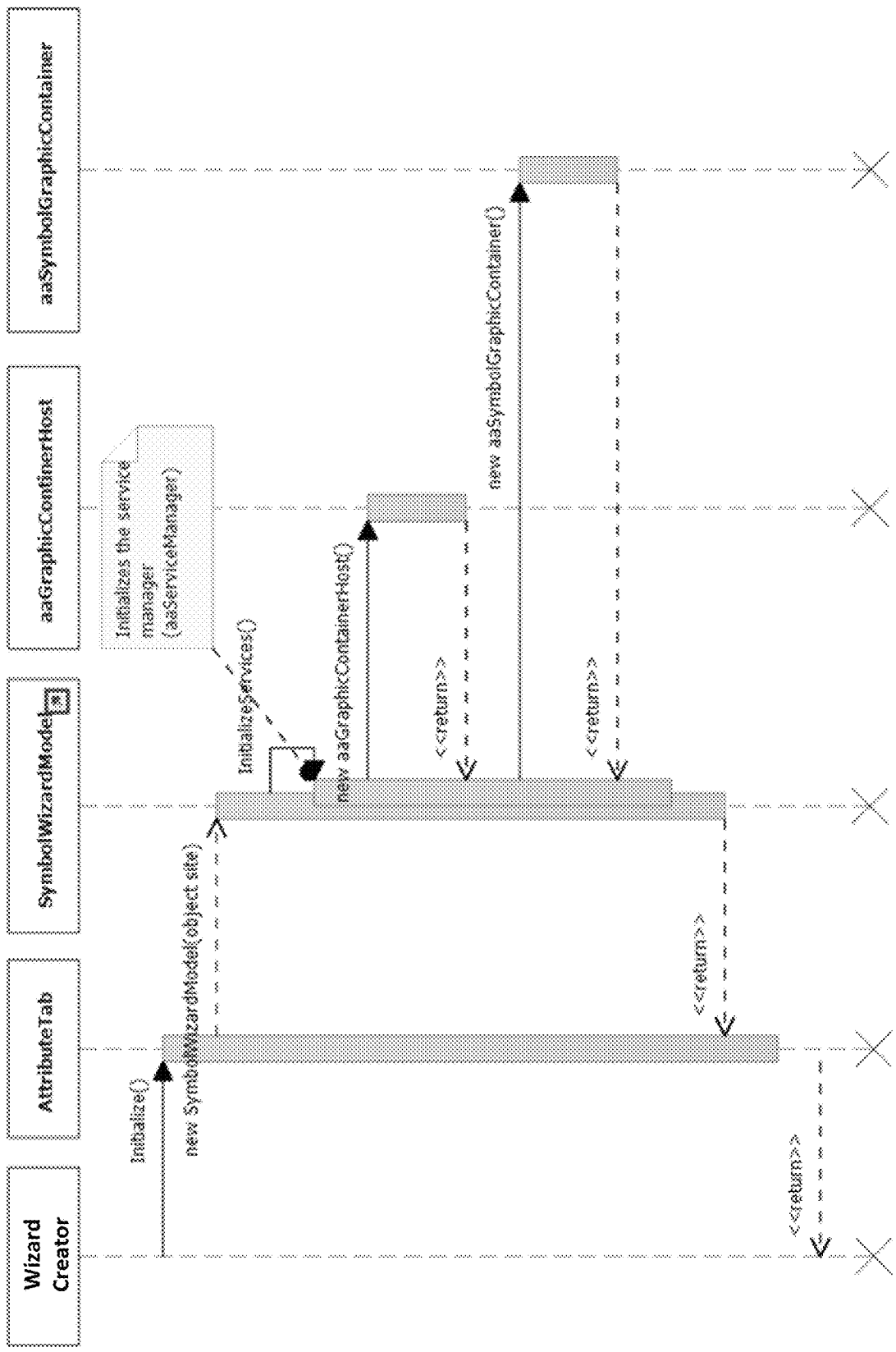
FIG. 8 to FIG. 14 are exemplary sequence diagrams according to an embodiment.
Figure 11:
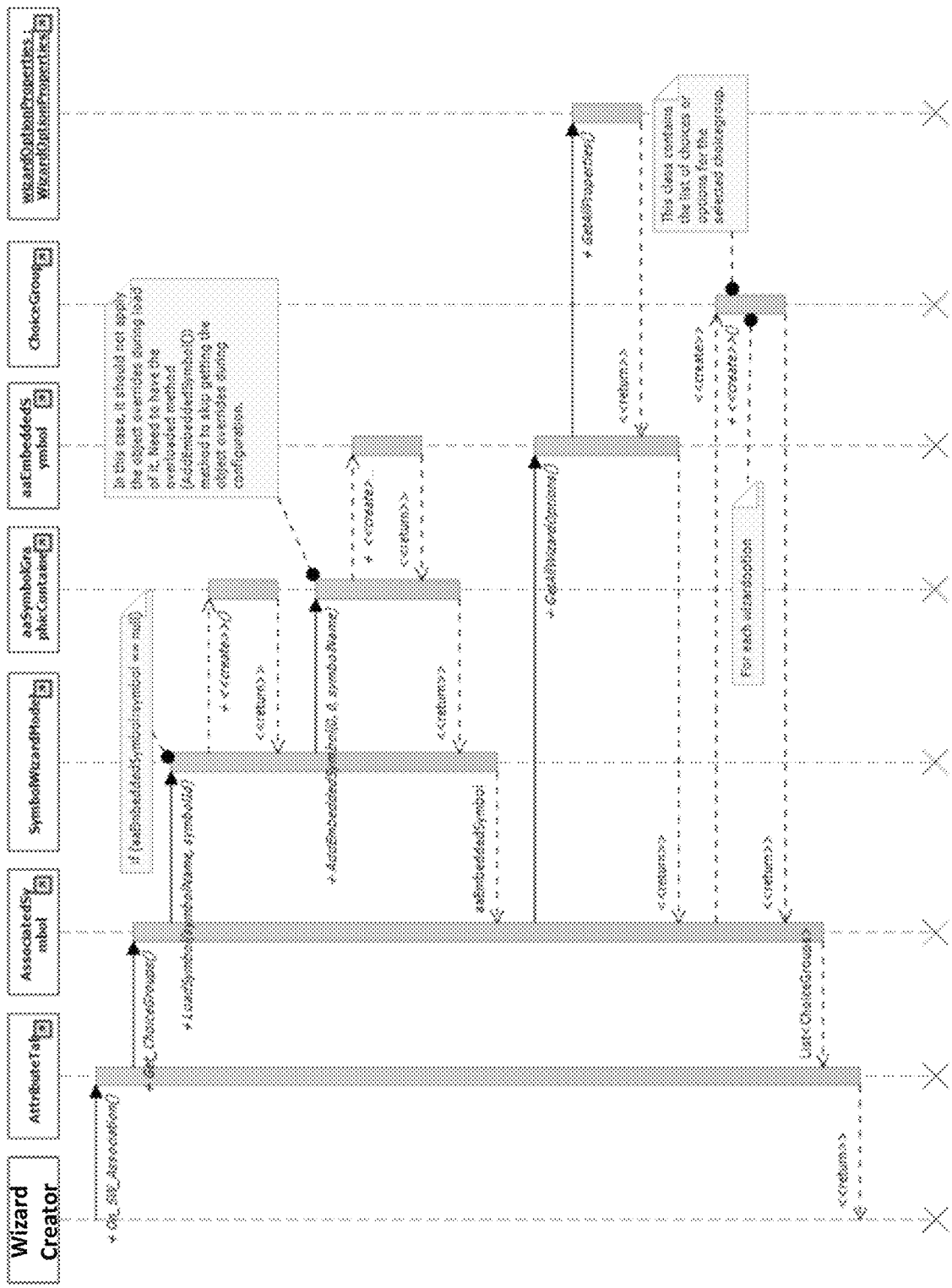

Initialize symbol wizard Model: FIG. 8 illustrates an exemplary Sequence—Initialize Symbol Wizard Model. FIG. 9 illustrates an exemplary Sequence—Get associated symbols. FIG. 10 illustrates an exemplary Sequence—Get thumbnail. FIG. 11 illustrates an exemplary Sequence—Get Symbol Wizard Options to get SW choice groups for the associated symbol. FIGS. 12A and 12B together illustrate an exemplary Get SW Overrides and FIG. 13 illustrates an exemplary Save and Load Instance Overrides. FIG. 14 illustrates an exemplary Loading Overview Symbols and Applying SW Settings for loading and applying the latest instance overrides for an embedded symbol.

Object Symbol change propagation to Overview symbols: Currently the inherited symbol of asset/object's change information is not getting added to database. The visual_element_timestamp table keeps track, all the symbol change information with the respective time stamp values of owned symbols. To save the inherited symbol change information with this table, updating all the symbols information may be needed when editing and saving the asset/object. If the asset has multiple inherited symbols then all these symbols information are updated to visual_element_timestamp table. While saving the asset/object, we need to explicitly make the change in Graphic Change type to Visual Element.

This change involves saving the symbol information though we are modifying the object. With this change in server side the graphic editor can get the object wizard's change notification. No change is needed at the client side as the existing the change notification from graphic editor to graphic editor is able to send the changed information to the graphic editor when the object symbol is embedded into overview symbol.

When opening the same object symbol that is being embedded, the graphic editor will initialize the graphic symbol and initiate the start monitor call (FIG. 8). When changing the symbol, the thread GetChangedVEAndCallVeListenerThread will request the package server to give the symbol change. The Graphic Library implements the two IaaVisualElementListener, IGraphicChangeNotification Interfaces.

Figure 15:
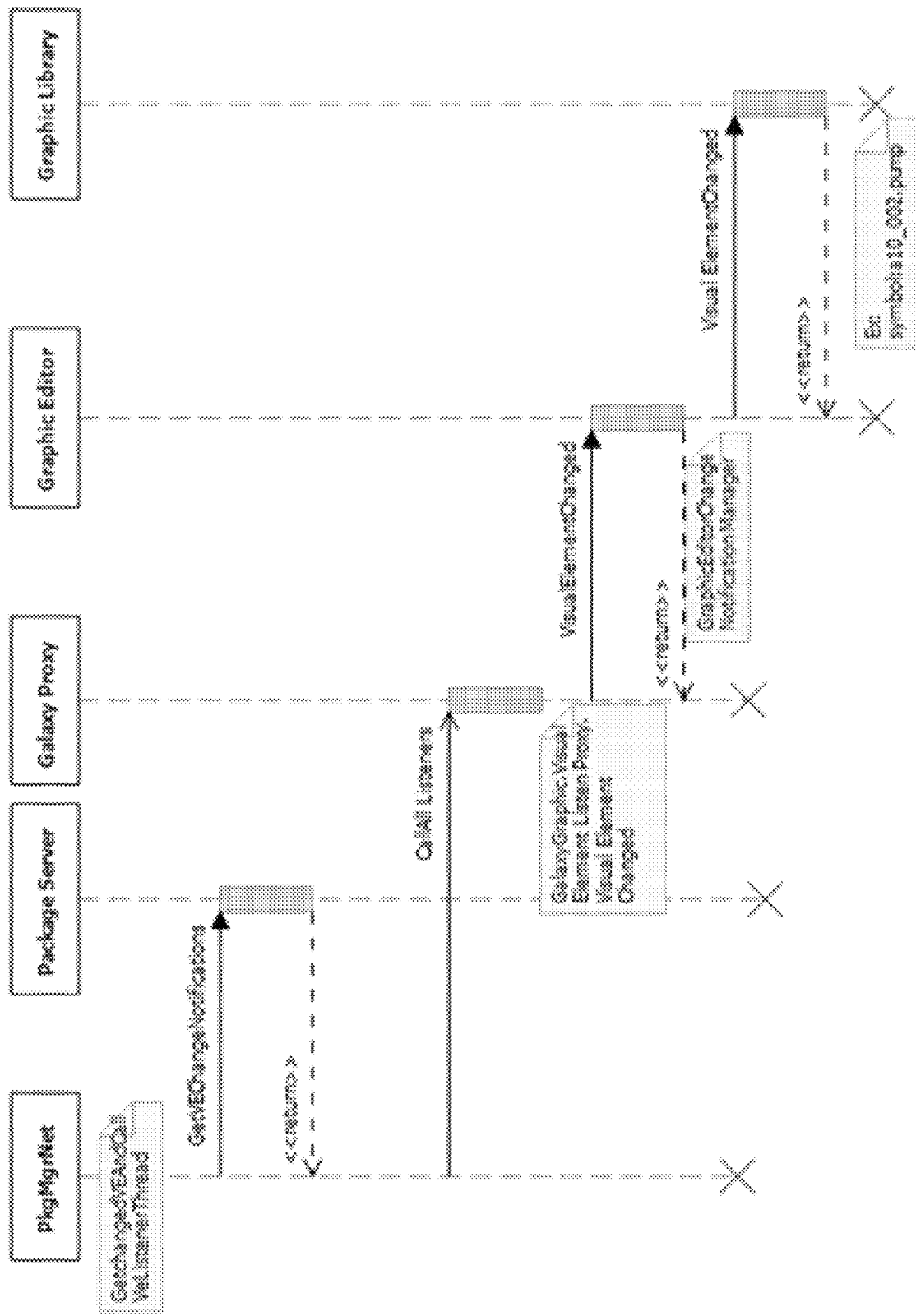
FIG. 15 is an exemplary sequence diagram illustrating event flow according to an embodiment.

The exemplary sequence diagram of FIG. 15 shows the event flow when the embedding symbol changes.

The following describes object wizards derivation support. Additional Choice Groups and Options can be added to a template derived from an object wizard. There are two main reasons for derivation:

Extend what another standards developer created to achieve a more capable wizard. This includes adding additional choice groups, options, attributes, symbols, associations and settings to accommodate the specific needs of a target solution. This process may also include modifying some of the characteristics of the existing wizard, changing its defaults, or hiding undesired choices.

Simplify the asset builder's job by preconfiguring aspects common to a set of similar assets. This may also include changing the existing wizard's defaults choices or settings, but not in a simpler manner. Settings specific to the related assets are provided, but not values associated with choices in order to change the behavior of the wizard.

Configuring a Derived Wizard: The workflow is the same as what exists for 1st Level Wizard Development, with the following restrictions:

Inherited Choice Groups, Choices, and Options cannot be renamed, deleted, or moved up/down and cannot have their prompt, description, or visibility rules edited Inherited Choices and Options cannot have their symbol/attribute associations or their settings removed Within the derived wizard the following are supported:

Defining additional Choice Groups (and their Choices) and Options

Moving Choice Groups and Options defined within the derived template up/down, including moving them above inherited Choice Groups and Options.

Configuring the choice for an inherited choice group or the default checked/unchecked state for an option. This does not just change the default choice. The action implicitly hides the choice group or option within the editor of any templates or instances derived from the wizard.

Counts for inherited Choice Groups, Choices and Options are reset and additions made within the derived template are included in the counts.

Override attribute/symbol setting values associated with inherited choices and options (same as the Asset Standard Developer's experience):

Value Example: Standards that includes specific Slow/Medium/Fast settings can be refined for a target customer or solution.

Add additional symbol/attribute associations and settings to an inherited choice or option:

Value Example: A customer's standards developer wants additional behavior to be associated with inherited choices/options.

Hide specific undesired Choices within inherited Choice Groups that are still visible:

Value Example: A customer's standards developer wants to allow the Asset Builder to configure valves to Fail Open or Fail Closed, but does not allow a valve's Fail Safe mode to be None.

Override inherited attribute/symbol setting visibility to the asset builder or graphic designer:

Value Example: A customer's standards developer can hide visible inherited settings that they do not want to be modified by the graphic designer.

Change the default choice group choice or option state without hiding the group or option (or their associated settings):

Value Example: A customer's standards developer wants to change the default selection for a Choice Group or Option to follow their company guideline, while still maintaining flexibility for the Asset Builder. Almost all analog valves in this facility might generally have position feedback, but in exceptional cases might not.

Additional Functionality includes refining visible attribute/symbol setting values (same as Asset Builder's experience):

Value Example: Settings visible to the Asset Builder can be preconfigured with values appropriate for a specific type of derived asset. Newly instantiated 3WayAnalogValves can be fully configured with appropriate default settings before being edited by the Asset Builder.

Linking GTB graphic with objects: In some embodiments of the System Platform, the system is allowed to embed the existing Graphic Tool Box (GTB) graphic inside of the object owned symbols to make use of the GTB graphics. The properties (or symbol wizard) of the GTB graphic cannot be accessed outside of the owned symbol when it is embedded and user needs to duplicate the properties from the owned symbol in order to associate with object wizards. At design time, the user wants to link or 'attach' a GTB graphic to a template or instance to utilize an existing GTB graphic without having to create a new owned graphic and re-embed the GTB graphic. So, the user can associate the linked symbols with object wizard and integrate symbol wizard settings without creating additional symbols. The GTB provides re-usable graphics in the system which can be utilized by multiple templates and instances with different ways:

Embedding into owned symbol

Link to GTB symbol

Link to GTB graphic using SAE: At design time the user can create a linked symbol using the Simplified Attribute Editor (SAE). The SAE provides a way to show the existing GTB graphics (Graphic browser) to browse and select the GTB graphic and link it with the object.

Associate Linked symbol with object wizard: The wizard developer can associate the linked symbol with object wizard settings and override the symbol wizard settings for a linked symbol just like other owned symbol. There is no functional difference for linked symbol when compare with object owned symbols.

Embed 'Linked symbol' of the object: User can embed the linked symbols inside of other graphic (or overview symbol) just like other object symbol. There is no change in functionality for embedding the linked symbols.

Change propagation to 'Linked symbol': Since linked symbol is a link to the original GTB graphic, if there is any change to the GTB graphic, the changes are propagated to linked symbols directly.

Publish 'Linked symbol' of the object: Publishing the linked symbol is same as other owned symbol of the object. There is no change in the functionality it works same as other object symbols. When multiple objects are linked to the same GTB-Graphic, during publish one copy of the GTB graphic is published. All of the other objects are links to the same GTB-Graphic without creating multiple copies.

Rename 'GTB-Symbol' which is linked with object: The current design of VERL takes care of updating the link when GTB-Graphic is renamed. Note that the linked symbol is just an empty symbol which internally linked to the GTB graphic. It means, the preview and thumbnail of the linked symbol is same as the GTB graphic when it is linked. For symbol wizard GTB graphic, the user can configure override values using object wizard settings to change the functionality of the symbol based on configured settings at runtime.

In an embodiment, aspects of the disclosure are integrated with symbol wizard functionality within Wonderware System Platform, as further described herein. Unlike object wizards, symbol wizards do not support multiple levels of derivation.

Figure 16:
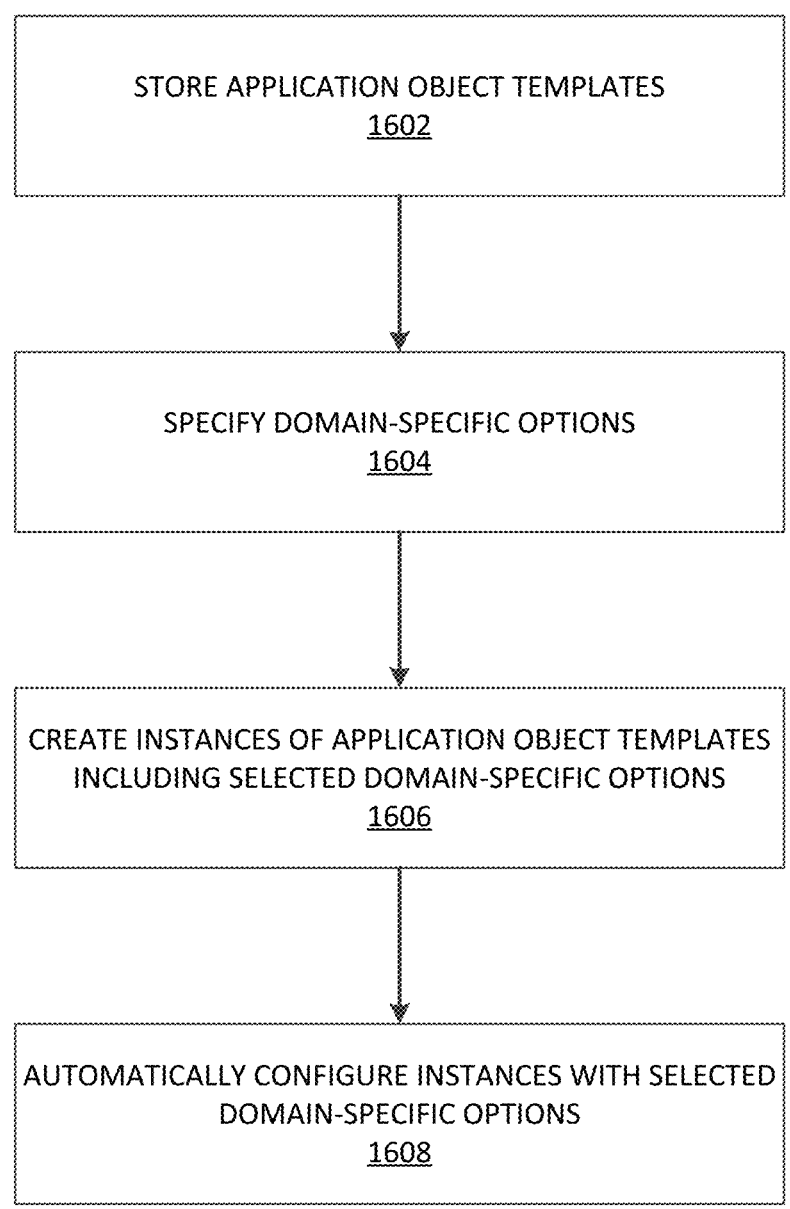
FIG. 16 is an exemplary method of deriving application object instances according to an embodiment.

FIG. 16 illustrates an exemplary method of deriving application object instances in accordance with an embodiment of the disclosure. At step 1602, an application object template library stores a set of previously defined application object templates. In an embodiment, the application object templates each include one or more elements representing a superset of domain-specific options common to a set of related assets of an industrial process. At step 1604, a configuration utility (e.g., an object wizard, etc.) specifies at least one of the domain-specific options for each element. At step 1606, the configuration utility creates instances of the application object templates to be included in a supervisory process control and manufacturing information application for the industrial process. The instances are comprised of one or more application objects instantiated from selected application object templates including selected domain-specific options. At step 1608, the configuration utility automatically configures the instances with the selected domain-specific options.

Embodiments of the present disclosure may comprise a special purpose computer including a variety of computer hardware, as described in greater detail below.

Embodiments within the scope of the present disclosure also include computer-readable media for carrying or having computer-executable instructions or data structures stored thereon. Such computer-readable media can be any available media that can be accessed by a special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the disclosure may be implemented. Although not required, aspects of the disclosure will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the disclosure includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes read only memory (ROM) and random access memory (RAM). A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, solid state drives (SSDs), and the like.

The computer typically includes a variety of computer readable media. Computer readable media can be any available media that can be accessed by the computer and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media are non-transitory and include, but are not limited to, RAM, ROM, EEPROM, flash memory or other memory technology, CD-ROM, digital versatile disks (DVD) or other optical disk storage, SSDs, magnetic cassettes, magnetic tape, magnetic disk storage or other magnetic storage devices, or any other medium which can be used to store the desired non-transitory information, which can accessed by the computer. Alternatively, communication media typically embody computer readable instructions, data structures, program modules or other data in a modulated data signal such as a carrier wave or other transport mechanism and includes any information delivery media.

Program code means comprising one or more program modules may be stored on the hard disk, magnetic disk, optical disk, ROM, and/or RAM, including an operating system, one or more application programs, other program modules, and program data. A user may enter commands and information into the computer through a keyboard, pointing device, or other input device, such as a microphone, joy stick, game pad, satellite dish, scanner, or the like. These and other input devices are often connected to the processing unit through a serial port interface coupled to the system bus. Alternatively, the input devices may be connected by other interfaces, such as a parallel port, a game port, or a universal serial bus (USB). A monitor or another display device is also connected to the system bus via an interface, such as video adapter 48. In addition to the monitor, personal computers typically include other peripheral output devices (not shown), such as speakers and printers.

One or more aspects of the disclosure may be embodied in computer-executable instructions (i.e., software), routines, or functions stored in system memory or nonvolatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in the embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects of the disclosure.

Embodiments may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A template-based supervisory process control and manufacturing information application development platform comprising:
a computer comprising one or more processors and one or more non-transitory computer storage media, the non-transitory computer storage media comprising instructions stored thereon that when executed by the processor implement:
an application object template library storing in at least one of the one or more non-transitory computer storage media a set of previously defined application object templates, said application object templates each including a superset of options common to a set of related domain objects; and
a configuration utility configured for specifying at least one domain-specific option of the superset, and creating an application object instance to be included in an application, said application object instance comprising at least one of the application object templates having the specified domain-specific option.

2. The template-based supervisory process control and manufacturing information application development facility of claim 1, wherein the domain-specific options define at least one of an attribute, a script, a symbol, and a behavior primitive of an asset to be included in an application object associated therewith.

3. The template-based supervisory process control and manufacturing information application development facility of claim 1, wherein the configuration utility is integrated with a symbol wizard.

4. The template-based supervisory process control and manufacturing information application development facility of claim 3, wherein the configuration utility propagates modified settings for the symbol wizard to the application object instance automatically.

5. The template-based supervisory process control and manufacturing information application development facility of claim 3, wherein the configuration utility is further configured to override settings of the symbol wizard and associate a graphic toolbox symbol with the application object instance.

6. The template-based supervisory process control and manufacturing information application development facility of claim 1, wherein the domain-specific options, when selected, enable values of attributes to be inherited from the application object templates.

7. The template-based supervisory process control and manufacturing information application development facility of claim 1, wherein the configuration utility is further configured to provide behavior testing of selected ones of the application object templates including selected ones of the domain-specific options before creating instances thereof.

8. A computer-implemented method of deriving application object instances, comprising:
providing a computer comprising one or more processors and one or more non-transitory computer storage media, the non-transitory computer storage media comprising instructions stored thereon that when executed by the processor implement:
storing, in an application object template library, a set of previously defined application object templates, wherein the application object templates each include one or more elements representing a superset of domain-specific options common to a set of related assets of an industrial process;
specifying, by an object wizard, at least one of the domain-specific options for each element;
creating, by the object wizard, instances of the application object templates to be included in a supervisory process control and manufacturing information application for the industrial process, wherein the instances comprise one or more application objects instantiated from selected ones of the application object templates including selected ones of the domain-specific options; and
automatically configuring, by the object wizard, the instances with the selected ones of the domain-specific options.

9. The method of claim 8, wherein the domain-specific options define at least one of an attribute, a script, a symbol, and a behavior primitive of an asset to be included in an application object associated therewith.

10. The method of claim 8, wherein the object wizard is integrated with a symbol wizard.

11. The method of claim 10, further comprising automatically propagating, by the object wizard, modified settings of the symbol wizard to the instances of the application object templates.

12. The method of claim 10, further comprising:
overriding, by the object wizard, settings of the symbol wizard; and
associating, by the object wizard, a graphic toolbox symbol with at least one of the instances of the application object templates.

13. The method of claim 8, wherein the domain-specific options, when selected, enable values of attributes to be inherited from the application object templates.

14. The method of claim 8, further comprising providing, by the object wizard, behavioral testing of selected ones of the application object templates including selected ones of the domain-specific options before said creating.

15. A system for providing object configuration utilities comprising:
a computer comprising one or more processors and one or more non-transitory computer storage media, the non-transitory computer storage media comprising instructions stored thereon that when executed by the processor implement:
an application object template library storing in at least one of the one or more non-transitory computer storage media a set of previously defined application object templates, said application object templates each comprising one or more elements representing a superset of domain-specific options common to a set of related assets of an industrial process; and
an object wizard configured for specifying at least one of the plurality of domain-specific options for each element, and creating instances of the application object templates to be included in an application, said instances comprising one or more application objects instantiated from selected ones of the application object templates including selected ones of the domain-specific options,
wherein the instances are automatically configured with the selected ones of the domain-specific options.

16. The computer readable storage device of claim 15, wherein the domain-specific options define at least one of an attribute, a script, a symbol, and a behavior primitive of an asset to be included in an application object associated therewith.

17. The computer readable storage device of claim 15, wherein the object wizard is integrated with a symbol wizard.

18. The computer readable storage device of claim 17, wherein the object wizard is further configured to override settings of the symbol wizard and associate a graphic toolbox symbol with at least one of the instances of the application object templates.

19. The computer readable storage device of claim 15, wherein the domain-specific options, when selected, enable values of attributes to be inherited from the application object templates.

20. The computer readable storage device of claim 15, wherein the object wizard is further configured to provide behavior testing of selected ones of the application object templates including selected ones of the domain-specific options before creating the instances thereof.

* * * * *